(12) United States Patent
Bogoni et al.

(10) Patent No.: US 9,716,553 B2
(45) Date of Patent: Jul. 25, 2017

(54) RADIO FREQUENCY SIGNAL TRANSCEIVER, COHERENT RADAR RECEIVER AND METHOD OF PROCESSING RADIO FREQUENCY SIGNALS

(75) Inventors: Antonella Bogoni, Mantova (IT); Paolo Ghelfi, Goito (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 98 days.

(21) Appl. No.: 14/397,393

(22) PCT Filed: Apr. 30, 2012

(86) PCT No.: PCT/EP2012/057910
§ 371 (c)(1),
(2), (4) Date: Apr. 8, 2015

(87) PCT Pub. No.: WO2013/164009
PCT Pub. Date: Nov. 7, 2013

(65) Prior Publication Data
US 2015/0207567 A1  Jul. 23, 2015

(51) Int. Cl.
*H04B 10/00* (2013.01)
*H04B 10/40* (2013.01)
(Continued)

(52) U.S. Cl.
CPC ......... *H04B 10/40* (2013.01); *H04B 10/2575* (2013.01); *H04B 10/556* (2013.01);
(Continued)

(58) Field of Classification Search
CPC .. H04B 10/2575; H04B 10/64; H04B 10/556; H04B 10/5561; H04B 10/505; H04B 10/61; H04B 10/516; H04B 10/548
(Continued)

(56) References Cited

U.S. PATENT DOCUMENTS 5,379,309 A * 1/1995 Logan, Jr. ............. H01S 5/4006
372/18
6,970,654 B1  11/2005 Paglione et al.

FOREIGN PATENT DOCUMENTS

JP  2005 353769 A  12/2005

OTHER PUBLICATIONS

PCT International Search Report, mailed Feb. 6, 2013, in connection with International Application No. PCT/EP2012/057910, all pages.

(Continued)

*Primary Examiner* — Hanh Phan
(74) *Attorney, Agent, or Firm* — Leffler Intellectual Property Law, PLLC

(57) ABSTRACT

An RF signal transceiver comprising a mode-locked laser to output an optical signal having a plurality of phase-locked modes, an optical splitter to power split the optical signal into a transmitter optical signal and a receiver optical signal; a transmitter apparatus to receive the transmitter optical signal and comprising an optical filter to select two of the modes, an optical modulator to modulate a part of the transmitter optical signal to form at least one phase modulated optical signal, and a photodetector to heterodyne the phase modulated optical signal with one of the modes without a corresponding phase modulation to form an RF signal for transmission; and a receiver apparatus arranged to receive an RF signal and the receiver optical signal and comprising an optical modulator to modulate the receiver optical signal with the received RF signal; and an optical to electrical signal conversion apparatus to convert the modulated receiver optical signal into a corresponding electrical signal.

11 Claims, 13 Drawing Sheets

(51) Int. Cl.
| | |
|---|---|
| H04B 10/90 | (2013.01) |
| H04B 10/2575 | (2013.01) |
| H04B 10/556 | (2013.01) |
| H04B 10/64 | (2013.01) |
| H04L 7/00 | (2006.01) |
| G02F 1/21 | (2006.01) |
| G02F 2/00 | (2006.01) |

(52) U.S. Cl.
CPC ............ H04B 10/64 (2013.01); H04B 10/90 (2013.01); H04L 7/0075 (2013.01); *G02F 2/002* (2013.01); *G02F 2001/212* (2013.01); *H04B 2210/006* (2013.01)

(58) Field of Classification Search
USPC ........ 398/115, 116, 117, 135, 136, 182, 183, 398/188, 186, 187, 200, 201, 202, 204, 398/205, 208, 66, 67, 68, 69, 70, 71, 72
See application file for complete search history.

(56) References Cited

OTHER PUBLICATIONS

Ghelfi, Paolo et al. "Novel Architecture for a Photonics-Assisted Radar Transceiver Based on a Single Mode-Locking Laser" IEEE Photonics Technology Letters, IEEE Service Center, Piscataway, NJ, USA, vol. 23, No. 10, May 1, 2011, pp. 639-641, XP011354890, ISSN: 1041-1135.

Laghezza, F. et al. "Reconfigurable radar transmitter based on photonic microwave signal generation" 2010 European Radar Conference, IEEE, Piscataway, NJ, USA, Sep. 30, 2010, pp. 336-339, XP031784520, ISBN: 978-1-4244-7234-5.

Maleki, L. et al. "On the development of photonic rf oscillators and resonant electro-optic modulators for advance RF front-end applications" 2011 Microwave Symposium Digest, IEEE, Jun. 5, 2011, pp. 1-4, XP032006589, ISBN: 978-1-61384-754-2.

Ghelfi, Paolo et al. "Generation of highly stable microwave signals based on regenerative fiber mode locked laser" Conference on Lasers and Electro-Optics (CLEO), Paper JWA47, 2010, pp. 1-2.

Ma, L. et al. "Demonstration of an optical sample parallelization for high speed photonic assisted ADCs" Electronics Letters, vol. 47, No. 5, Mar. 2011, pp. 333-335.

"CISCO Visual Networking Index: Global Mobile Data Traffic Forecast Update, 2013-2018 White Paper", Feb. 5, 2014, pp. 1-40, FLGD11446.

Kaul, Aditya "Software Defined Radio: The Transmission from Defense to Commercial Markets" Proceedings of the SDR 2007 Technical Conference and Product Exposition, pp. 1-7, SDR Forum, 2007.

Sun, Jie et al. "Stable Dual-Wavelength DFB Fiber Laser With Separate Resonant Cavities and Its Application in Tunable Microwave Generation" IEEE Photonics Technology Letters, vol. 18, No. 24, Dec. 15, 2006, pp. 2587-2589.

Valley, George C. "Photonic Analog-to-Digital Converters—A Tutorial" 2009 OSA/OFC/NFOEC, pp. 1-48, IEEE, 978-1-55752-865-0/09.

Pierno, L. et al. "A Photonic ADC for radar and EW applications based on modelocked laser" 2008, IEEE, pp. 236-239, 978-1-4244-2169-5108.

Chou, Jason et al. "Photonic Bandwidth Compression Front End for Digital Oscilloscopes" Journal of Lightwave Technology, vol. 27, No. 22, Nov. 15, 2009, pp. 5073-5077.

"Pico-Second Laser Source Preliminary Datasheet, Product Code: PSLS 1040/1042/1053" u2tphotonics, Pre-DS-PSLS_2v0, pp. 1-6, Retrieved from the Internet: http://www.datasheetarchive.com/manufacturers/U2T+Photonics+AG.html, 2007.

Ghelfi, Paolo et al. "Letter: A fully photonics-based coherent radar system" doi: 10.1038/nature13078, Mar. 20, 2014, vol. 507, Nature, pp. 341-345, 2014 Macmillan Publishers LTD.

Laghezza, Francesco et al. "Flexible Photonic Generation of Low-Phase-Noise Phase-Coded Radar Pulses", Optronic in Defence and Security (OPTRO), Feb. 2012, Paris, France, pp. 1-11.

\* cited by examiner

RADIO FREQUENCY SIGNAL TRANSCEIVER, COHERENT RADAR RECEIVER AND METHOD OF PROCESSING RADIO FREQUENCY SIGNALS

TECHNICAL FIELD

The invention relates to a radio frequency signal transceiver, a mobile communications network base station comprising the radio frequency transceiver, a coherent radar transceiver comprising the radio frequency signal transceiver and a method of processing radio frequency signals.

BACKGROUND

With the growing demand for mobile broadband services and the appearance of new high-capacity mobile devices (e.g., smartphones, tablets) and applications, mobile networks users are requiring an ever increasing high-quality consumer experience, thus putting today's networks under tremendous pressure. Although the solutions currently under development (such as the Long Term Evolution-Advanced (LTE-A) standardized by 3GPP) represent a 4-times capacity increase over current 3 G systems, the envisaged band improvements will be inadequate to address all future requirements, making new approaches necessary. The ultra-high frequency (UHF, from 300 MHz to 3 GHz) spectrum which is currently allocated for mobile communications is becoming increasingly inadequate. In contrast, a large part of the spectrum in the 3-300 GHz frequency band, referred to as the millimeter-wave band (MMB), remains underutilized because of technical limitations, such as the stability of high radio frequency (RF) oscillators and the limited transmission range. The scenario of interest for the future is cellular networks that integrate the sub-3 GHz spectrum range with the new MMB.

Current RF equipment cannot manage the transmission and reception of wireless signals with frequencies ranging from few MHz to several GHz, thus each communication bandwidth requires the use of a specific RF transceiver, which means a specific cellular transmission system. Recently, photonic solutions have been proposed for generating phase-stable RF signals which avoid the up-conversion in noisy mixers at the wireless transmitter. As will be well known to the person skilled in the art, the heterodyne detection of two continuous wave (CW) optical signals in a photodiode generates a sinusoidal signal at their frequency difference, which can be used as an RF carrier. If one of the optical signals is also modulated, its modulation shape is transferred onto the beat signal directly at RF. When the two CW optical signals are phase-locked to each other the generated RF signal is particularly stable. This is the case when the CW optical signals are selected from the modes of a mode locking laser (MLL): the intrinsic phase-locking condition of the MLL ensures an extremely low phase noise in the generated RF signal, with excellent stability up to ultra high frequencies (up to W band and more) where performance of electronic generators strongly degrades, as reported by P. Ghelfi et al, "Generation of highly stable microwave signals based on regenerative fiber mode locked laser", Conference on Lasers and Electro-Optics (CLEO), paper JWA47, 2010.

SUMMARY

It is an object to provide an improved radio frequency signal transceiver. It is a further object to provide an improved mobile communications network base station. It is a further object to provide an improved a coherent radar transceiver. It is a further object to provide an improved a method of processing radio frequency signals.

A first aspect of the invention provides a radio frequency signal transceiver comprising a mode-locked laser, an optical splitter, transmitter apparatus and receiver apparatus. The mode-locked laser is arranged to output an optical signal having a plurality of phase-locked modes. The optical splitter is arranged to power split the optical signal into a transmitter optical signal and a receiver optical signal. Transmitter apparatus is arranged to receive the transmitter optical signal and comprises an optical filter, a first optical modulator and a first photodetector. The optical filter is arranged to filter the transmitter optical signal to select two of the modes. The first optical modulator is arranged to modulate a part of the transmitter optical signal to form at least one phase modulated optical signal. The first photodetector is arranged to heterodyne the phase modulated optical signal with one of the modes without a corresponding phase modulation to form a radio frequency signal for transmission. The radio frequency signal for transmission has a carrier frequency corresponding to a difference in optical frequencies of the heterodyned signals. The receiver apparatus is arranged to receive a radio frequency signal and the receiver optical signal and comprises a second optical modulator and first optical to electrical signal conversion apparatus. The second optical modulator is arranged to modulate the receiver optical signal with the received radio frequency signal. The first optical to electrical signal conversion apparatus is arranged to convert the modulated receiver optical signal into a corresponding electrical signal.

The transceiver may enable the phase stability of the transmitted and received RF signals to be improved, avoiding the noisy analog up- and down-conversions typical of the electronic RF generation and detection. This reduction of distortions and phase noise will result in an increased system sensitivity which could permit a reduction in the total number of deployed base stations, helping network operators reducing the system costs.

The transceiver may provide high phase stability at the transmitter and high resolution at the receiver, regardless of the carrier frequency, which may enable the exploitation of multicarrier orthogonal signals (e.g., orthogonal frequency-division multiplexed (OFDM) signals) in MMB transmissions, which are particularly sensitive to phase stability in the carrier signal.

The architecture of the transceiver may enable it to be constructed using available commercial devices, most comprising integrated technologies, which may allow the immediate and practical realization of a photonics-assisted transceiver, permitting a strong reduction in communications system development costs.

The ability of the transceiver to generate RF signals in the MMB may allow the implementation of cellular communications systems providing gigabit-per-second transmissions to the final users, thanks to the large fractional bandwidth of the MMB, while maintaining compatibility with existing cellular systems.

The use of photonics technologies to generate RF signals may allow a completely software-defined RF architecture to be implemented, increasing the level of flexibility and reconfigurability of cellular communication systems, and thus enabling them to simultaneously treat multiple wireless transmission protocols.

The use of photonics techniques for generating and detecting the RF signals may allow optical fibres to be used to move communications signals to and from base station antennae (antenna remoting), reducing the amount of devices and the power consumption at the antenna pole thanks to the negligible attenuation of fibre transmission. This may also simplify antenna installation.

The second optical modulator implements optical sampling of the received RF signal which may realise a signal down-conversion without using a mixer, which may improve the stability and resolution of the receiver apparatus as compared to prior art electronic based transceivers. The receiver apparatus may enable a sampling repetition rate of up to hundreds of GHz to be used and may therefore avoid the limitations imposed on the sampling rate in electronic systems.

In an embodiment, the optical filter is arranged to filter the transmitter optical signal to select a plurality of pairs of the modes, the modes of each pair having the same difference in optical frequencies. The RF signal for transmission may therefore be formed from a number of pairs of modes each having the same detuning.

In an embodiment, the first optical modulator is arranged to modulate the part of the transmitter optical signal with a modulation signal having an intermediate frequency to generate sideband signals. The first optical modulator is arranged to apply a phase modulation to one or more of the sideband signals or the modes. The first photodetector is arranged to heterodyne at least one of the phase modulated signals with at least one of the other signals without a corresponding phase modulation to form at least one radio frequency signal. The at least one radio frequency signal has a carrier frequency corresponding to a difference in optical frequencies of the respective heterodyned signals.

Modulating the transmitter optical signal with a modulation signal having an intermediate frequency, that is a frequency less than the optical frequency spacing of the modes of the mode locked laser, may enable a phase modulation to be encoded onto the resulting RF signal without affecting the reciprocal phase stability of the modes which are to be heterodyned to form the RF signal.

In an embodiment, the first photodetector is arranged to heterodyne the signals to form a plurality of radio frequency signals. Each radio frequency signal has a carrier frequency corresponding to a difference in optical frequencies of the respective heterodyned signals from which it is formed. The transmitter apparatus further comprises a radio frequency signal filter arranged to select one of the radio frequency signals for transmission.

This may allow a completely software-defined RF architecture to be implemented, increasing the level of flexibility and reconfigurability of cellular communication systems, and thus enabling them to simultaneously treat multiple wireless transmission protocols.

In an embodiment, the radio frequency signal filter is arranged to select the radio frequency signal having a carrier frequency corresponding to the difference in optical frequencies of one of the modes and one of the phase modulated sideband signals. The heterodyne between the mode and the phase modulated sideband signal enables a desired phase and/or amplitude modulation to be incorporated in the RF signal.

In an embodiment, the modulation signal comprises a phase modulation encoding communications traffic to be carried by the radio frequency signal for transmission.

In an embodiment, the modulation signal comprises a plurality of communications traffic signals each comprising respective communications traffic and the transmitter apparatus comprises a plurality of radio frequency signal filters, each said filter being arranged to select a different one of the radio frequency signals for transmission.

In an embodiment, the transmitter apparatus comprises a plurality of first optical modulators, a corresponding plurality of first photodetectors and a corresponding plurality of radio frequency signal filters. Each first optical modulator is arranged to receive a respective modulation signal comprising a respective communications traffic signal comprising respective communications traffic. Each radio frequency signal filter is arranged to select a respective radio frequency signal for transmission.

Configuring the transceiver to be able to select one of a plurality of different RF signals for transmission may enable a reduction in the hardware required for a multi-carrier communications system by treating a large number of communication protocols and bandwidths in a single transceiver. This may result in a reduction of both the power consumption and the network capital expenditure, and may simplify the management of different communication protocols in a single base station and the hand-off between them. The RF signal carrier frequency flexibility of the transceiver may allow simultaneous implementation of wireless backhauling of a cellular communications network base station, which may simplify the deployment of microcells and picocells in the absence of wired connections. The generation of combs of phase-stable wireless channels may enable effective frequency hopping techniques for increasing the communication security of a cellular communications network.

In an embodiment, the mode-locked laser is arranged to receive an electrical clock signal and is configured to have a pulse repetition rate locked to the electrical clock signal. The transmitter apparatus comprises a clock signal divider arranged to receive the electrical clock signal and arranged to divide the electrical clock signal by a pre-selected division factor, K, to form the modulation signal at the intermediate frequency. This may avoid the use of an ultra-stable clock to produce the modulation signal at the intermediate frequency. The frequency shift of the RF signal carrier frequency introduced by modulation at the intermediate frequency makes the carrier frequency different from the MLL repetition rate. This may enable the transceiver to be used in situations where the RF signal for transmission and the received RF signal have the same carrier frequency.

In an embodiment, the clock signal divider is arranged to divide the electrical clock signal by one of a plurality of division factors, K, to form the modulation signal at one of a plurality of intermediate frequencies. This may provide flexibility in the RF signal carrier frequency, the division factor being selected to obtain a chosen intermediate frequency and thus a chosen carrier frequency.

In an embodiment, the receiver apparatus comprises a rate increaser arranged to increase the repetition rate of the receiver optical signal prior to modulation at the second optical modulator. This may enable a different repetition rate to be used at the transmitter apparatus and the receiver apparatus, allowing optimisation of the repetition rate for each; a lower repetition rate may be used at the transmitter apparatus to set the minimum available RF signal carrier frequency; and a higher repetition rate may be used at the receiver apparatus to set the maximum sampling rate.

In an embodiment, the rate increaser comprises one of an optical time domain multiplexer and an optical filter.

In an embodiment, the second optical modulator is arranged to modulate the receiver optical signal with the received radio frequency signal to form optical samples and the receiver apparatus further comprises sample parallelisation apparatus arranged to receive the optical samples at a first pulse rate and to convert the optical samples into a plurality of streams of optical samples, each stream having a second pulse rate lower than the first pulse rate. The first optical to electrical signal conversion apparatus is arranged to convert the optical samples into corresponding electrical samples. Reducing the pulse rate of the optical samples may enable high-precision electronic analog to digital converters operating a low sampling rates to be used to acquire the samples after detection by the photodetector.

In an embodiment, the sample parallelisation apparatus comprises one of an electro-optical time domain demultiplexer and an all-optical time domain demultiplexer.

In an embodiment, the receiver apparatus further comprises pulse broadening apparatus arranged to receive the optical samples having a first pulse width and to increase the pulse width of the optical samples. In an embodiment the pulse broadening apparatus is arranged to apply a chromatic dispersion to each optical sample. Broadening the pulses prior to detection at the photodetector, so that the spectral bandwidth of the optical samples better fits the bandwidth of the photodetector, may minimise power loss during detection at the photodetector.

In an embodiment, the receiver apparatus is arranged to receive a plurality of radio frequency signals and is arranged to sum said plurality of signals. The second optical modulator is arranged to modulate the receiver optical signal with the summed signals. The mode-locked laser is configured to have a pulse repetition rate which meets the low-pass Nyquist sampling theorem. This may enable sampling of all of the received RF signals at the same time, which may therefore enable all user channels and all communications bandwidths of a multi-carrier cellular communications network to be acquired at the same time. Selecting the pulse repetition rate, i.e. the sampling rate, to meet the low-pass Nyquist sampling theorem may enable all of the received RF signal to be optically sampled together.

In an embodiment, the receiver apparatus is arranged to receive a plurality of radio frequency signals and is arranged to sum said plurality of signals. The second optical modulator is arranged to modulate the receiver optical signal with the summed signals. The mode-locked laser is configured to have a pulse repetition rate which meets the band-pass Nyquist sampling theorem. If the spectral occupancy of all the received RF signals is low enough, the sampling rate can be reduced, exploiting the band-pass Nyquist theorem instead of the low-pass Nyquist theorem. In this case, if the occupied spectral ranges are a small portion of the available spectrum, the sampling frequency can be chosen in order to allow the correct acquisition of all the communication bands of interest, avoiding the superposition of alias spectra.

In an embodiment, the receiver apparatus is arranged to receive a plurality of radio frequency signals and comprises a plurality of second optical modulators. Each second optical modulator is arranged to receive a respective sub-set of the received radio frequency signals and a portion of the receiver optical signal. The mode-locked laser is configured to have a pulse repetition rate which meets the band-pass Nyquist sampling theorem. If the occupied spectral ranges are too large a portion of the available spectrum (i.e. it is not possible to avoid the superposition of alias spectra) the band-pass Nyquist theorem can be applied to each of a plurality of different portions of the spectrum. Each second optical modulator receives a different portion of the spectrum to be separately sampled, exploiting parallel optical sampling.

In an embodiment, each optical modulator is a Mach-Zehnder optical modulator.

The transceiver may enable simultaneous generation and reception of multi-band wireless signals, which may enable the implementation of a multi-band multi-protocol wireless base station, strongly reducing the hardware requirements and extending the exploited frequency spectrum to the underutilized MMB.

A second aspect of the invention provides a mobile communications network base station comprising a radio frequency signal transceiver. The radio frequency signal transceiver comprises a mode-locked laser, an optical splitter, transmitter apparatus and receiver apparatus. The mode-locked laser is arranged to output an optical signal having a plurality of phase-locked modes. The optical splitter is arranged to power split the optical signal into a transmitter optical signal and a receiver optical signal. Transmitter apparatus is arranged to receive the transmitter optical signal and comprises an optical filter, a first optical modulator and a first photodetector. The optical filter is arranged to filter the transmitter optical signal to select two of the modes. The first optical modulator is arranged to modulate a part of the transmitter optical signal to form at least one phase modulated optical signal. The first photodetector is arranged to heterodyne the phase modulated optical signal with one of the modes without a corresponding phase modulation to form a radio frequency signal for transmission. The radio frequency signal for transmission has a carrier frequency corresponding to a difference in optical frequencies of the heterodyned signals. The receiver apparatus is arranged to receive a radio frequency signal and the receiver optical signal and comprises a second optical modulator and first optical to electrical signal conversion apparatus. The second optical modulator is arranged to modulate the receiver optical signal with the received radio frequency signal. The first optical to electrical signal conversion apparatus is arranged to convert the modulated receiver optical signal into a corresponding electrical signal.

The transceiver may enable the phase stability of the transmitted and received RF signals to be improved, avoiding the noisy analog up- and down-conversions typical of the electronic RF generation and detection. This reduction of distortions and phase noise will result in an increased system sensitivity which could permit a reduction in the total number of deployed base stations, helping network operators reducing the system costs.

The transceiver may provide high phase stability at the transmitter and high resolution at the receiver, regardless of the carrier frequency, which may enable the exploitation of multicarrier orthogonal signals (e.g., orthogonal frequency-division multiplexed (OFDM) signals) in MMB transmissions, which are particularly sensitive to phase stability in the carrier signal.

The architecture of the transceiver may enable it to be constructed using available commercial devices, most comprising integrated technologies, which may allow the immediate and practical realization of a photonics-assisted transceiver, permitting a strong reduction in communications system development costs.

The ability of the transceiver to generate RF signals in the MMB may allow the implementation of cellular communications systems providing gigabit-per-second transmissions to the final users, thanks to the large fractional bandwidth of the MMB, while maintaining compatibility with existing cellular systems.

The use of photonics technologies to generate RF signals may allow a completely software-defined RF architecture to be implemented, increasing the level of flexibility and reconfigurability of cellular communication systems, and thus enabling them to simultaneously treat multiple wireless transmission protocols.

The use of photonics techniques for generating and detecting the RF signals may allow optical fibres to be used to move communications signals to and from base station antennae (antenna remoting), reducing the amount of devices and the power consumption at the antenna pole thanks to the negligible attenuation of fibre transmission. This may also simplify antenna installation.

The second optical modulator implements optical sampling of the received radio frequency signal which may realise a signal down-conversion without using a mixer, which may improve the stability and resolution of the receiver apparatus as compared to prior art electronic based transceivers. The receiver apparatus may enable a sampling repetition rate of up to hundreds of GHz to be used and may therefore avoid the limitations imposed on the sampling rate in electronic systems.

In an embodiment, the optical filter is arranged to filter the transmitter optical signal to select a plurality of pairs of the modes, the modes of each pair having the same difference in optical frequencies. The RF signal for transmission may therefore be formed from a number of pairs of modes each having the same detuning.

In an embodiment, the first optical modulator is arranged to modulate the part of the transmitter optical signal with a modulation signal having an intermediate frequency to generate sideband signals. The first optical modulator is arranged to apply a phase modulation to one or more of the sideband signals or the modes. The first photodetector is arranged to heterodyne at least one of the phase modulated signals with at least one of the other signals without a corresponding phase modulation to form at least one radio frequency signal. The at least one radio frequency signal has a carrier frequency corresponding to a difference in optical frequencies of the respective heterodyned signals.

Modulating the transmitter optical signal with a modulation signal having an intermediate frequency, that is a frequency less than the optical frequency spacing of the modes of the mode locked laser, may enable a phase modulation to be encoded onto the resulting RF signal without affecting the reciprocal phase stability of the modes which are to be heterodyned to form the RF signal.

In an embodiment, the first photodetector is arranged to heterodyne the signals to form a plurality of radio frequency signals. Each radio frequency signal has a carrier frequency corresponding to a difference in optical frequencies of the respective heterodyned signals from which it is formed. The transmitter apparatus further comprises a radio frequency signal filter arranged to select one of the radio frequency signals for transmission.

This may allow a completely software-defined RF architecture to be implemented, increasing the level of flexibility and reconfigurability of cellular communication systems, and thus enabling them to simultaneously treat multiple wireless transmission protocols.

In an embodiment, the radio frequency signal filter is arranged to select the radio frequency signal having a carrier frequency corresponding to the difference in optical frequencies of one of the modes and one of the phase modulated sideband signals. The heterodyne between the mode and the phase modulated sideband signal enables a desired phase and/or amplitude modulation to be incorporated in the RF signal.

In an embodiment, the modulation signal comprises a phase modulation encoding communications traffic to be carried by the radio frequency signal for transmission.

In an embodiment, the modulation signal comprises a plurality of communications traffic signals each comprising respective communications traffic and the transmitter apparatus comprises a plurality of radio frequency signal filters, each said filter being arranged to select a different one of the radio frequency signals for transmission.

In an embodiment, the transmitter apparatus comprises a plurality of first optical modulators, a corresponding plurality of first photodetectors and a corresponding plurality of radio frequency signal filters. Each first optical modulator is arranged to receive a respective modulation signal comprising a respective communications traffic signal comprising respective communications traffic. Each radio frequency signal filter is arranged to select a respective radio frequency signal for transmission.

Configuring the transceiver to be able to select one of a plurality of different RF signals for transmission may enable a reduction in the hardware required for a multi-carrier communications system by treating a large number of communication protocols and bandwidths in a single transceiver. This may result in a reduction of both the power consumption and the network capital expenditure, and may simplify the management of different communication protocols in a single base station and the hand-off between them. The RF signal carrier frequency flexibility of the transceiver may allow simultaneous implementation of wireless backhauling of a cellular communications network base station, which may simplify the deployment of microcells and picocells in the absence of wired connections. The generation of combs of phase-stable wireless channels may enable effective frequency hopping techniques for increasing the communication security of a cellular communications network.

In an embodiment, the mode-locked laser is arranged to receive an electrical clock signal and is configured to have a pulse repetition rate locked to the electrical clock signal. The transmitter apparatus comprises a clock signal divider arranged to receive the electrical clock signal and arranged to divide the electrical clock signal by a pre-selected division factor, K, to form the modulation signal at the intermediate frequency. This may avoid the use of an ultra-stable clock to produce the modulation signal at the intermediate frequency. The frequency shift of the RF signal carrier frequency introduced by modulation at the intermediate frequency makes the carrier frequency different from the MLL repetition rate. This may enable the transceiver to be used in situations where the RF signal for transmission and the received RF signal have the same carrier frequency.

In an embodiment, the clock signal divider is arranged to divide the electrical clock signal by one of a plurality of division factors, K, to form the modulation signal at one of a plurality of intermediate frequencies. This may provide flexibility in the RF signal carrier frequency, the division factor being selected to obtain a chosen intermediate frequency and thus a chosen carrier frequency.

In an embodiment, the receiver apparatus comprises a rate increaser arranged to increase the repetition rate of the receiver optical signal prior to modulation at the second optical modulator. This may enable a different repetition rate to be used at the transmitter apparatus and the receiver apparatus, allowing optimisation of the repetition rate for each; a lower repetition rate may be used at the transmitter apparatus to set the minimum available RF signal carrier frequency; and a higher repetition rate may be used at the receiver apparatus to set the maximum sampling rate.

In an embodiment, the rate increaser comprises one of an optical time domain multiplexer and an optical filter.

In an embodiment, the second optical modulator is arranged to modulate the receiver optical signal with the received radio frequency signal to form optical samples and the receiver apparatus further comprises sample parallelisation apparatus arranged to receive the optical samples at a first pulse rate and to convert the optical samples into a plurality of streams of optical samples, each stream having a second pulse rate lower than the first pulse rate. The first optical to electrical signal conversion apparatus is arranged to convert the optical samples into corresponding electrical samples. Reducing the pulse rate of the optical samples may enable high-precision electronic analog to digital converters operating a low sampling rates to be used to acquire the samples after detection by the photodetector.

In an embodiment, the sample parallelisation apparatus comprises one of an electro-optical time domain demultiplexer and an all-optical time domain demultiplexer.

In an embodiment, the receiver apparatus further comprises pulse broadening apparatus arranged to receive the optical samples having a first pulse width and to increase the pulse width of the optical samples. In an embodiment the pulse broadening apparatus is arranged to apply a chromatic dispersion to each optical sample. Broadening the pulses prior to detection at the photodetector, so that the spectral bandwidth of the optical samples better fits the bandwidth of the photodetector, may minimise power loss during detection at the photodetector.

In an embodiment, the receiver apparatus is arranged to receive a plurality of radio frequency signals and is arranged to sum said plurality of signals. The second optical modulator is arranged to modulate the receiver optical signal with the summed signals. The mode-locked laser is configured to have a pulse repetition rate which meets the low-pass Nyquist sampling theorem. This may enable sampling of all of the received RF signals at the same time, which may therefore enable all user channels and all communications bandwidths of a multi-carrier cellular communications network to be acquired at the same time. Selecting the pulse repetition rate, i.e. the sampling rate, to meet the low-pass Nyquist sampling theorem may enable all of the received RF signal to be optically sampled together.

In an embodiment, the receiver apparatus is arranged to receive a plurality of radio frequency signals and is arranged to sum said plurality of signals. The second optical modulator is arranged to modulate the receiver optical signal with the summed signals. The mode-locked laser is configured to have a pulse repetition rate which meets the band-pass Nyquist sampling theorem. If the spectral occupancy of all the received RF signals is low enough, the sampling rate can be reduced, exploiting the band-pass Nyquist theorem instead of the low-pass Nyquist theorem. In this case, if the occupied spectral ranges are a small portion of the available spectrum, the sampling frequency can be chosen in order to allow the correct acquisition of all the communication bands of interest, avoiding the superposition of alias spectra.

In an embodiment, the receiver apparatus is arranged to receive a plurality of radio frequency signals and comprises a plurality of second optical modulators. Each second optical modulator is arranged to receive a respective sub-set of the received radio frequency signals and a portion of the receiver optical signal. The mode-locked laser is configured to have a pulse repetition rate which meets the band-pass Nyquist sampling theorem. If the occupied spectral ranges are too large a portion of the available spectrum (i.e. it is not possible to avoid the superposition of alias spectra) the band-pass Nyquist theorem can be applied to each of a plurality of different portions of the spectrum. Each second optical modulator receives a different portion of the spectrum to be separately sampled, exploiting parallel optical sampling.

In an embodiment, each optical modulator is a Mach-Zehnder optical modulator.

The transceiver may enable simultaneous generation and reception of multi-band wireless signals, which may enable the implementation of a multi-band multi-protocol wireless base station, strongly reducing the hardware requirements and extending the exploited frequency spectrum to the underutilized MMB.

A third aspect of the invention provides a coherent radar transceiver comprising a radio frequency signal transceiver. The radio frequency signal transceiver comprises a mode-locked laser, an optical splitter, transmitter apparatus, and receiver apparatus. The mode-locked laser is arranged to output an optical signal having a plurality of phase-locked modes. The optical splitter is arranged to power split the optical signal into a transmitter optical signal and a receiver optical signal. Transmitter apparatus is arranged to receive the transmitter optical signal and comprises an optical filter, a first optical modulator and a first photodetector. The optical filter is arranged to filter the transmitter optical signal to select two of the modes. The first optical modulator is arranged to modulate a part of the transmitter optical signal to form at least one phase modulated optical signal. The first photodetector is arranged to heterodyne the phase modulated optical signal with one of the modes without a corresponding phase modulation to form a radio frequency signal for transmission. The radio frequency signal for transmission has a carrier frequency corresponding to a difference in optical frequencies of the heterodyned signals. The receiver apparatus is arranged to receive a radio frequency signal and the receiver optical signal and comprises a second optical modulator, first optical to electrical signal conversion apparatus and reference signal sampling apparatus. The second optical modulator is arranged to modulate the receiver optical signal with the received radio frequency signal. The first optical to electrical signal conversion apparatus is arranged to convert the modulated receiver optical signal into a corresponding electrical signal. The receiver apparatus further comprises reference signal sampling apparatus arranged to receive a portion of the radio frequency signal for transmission and a portion of the receiver optical signal, the reference signal sampling apparatus comprising a third optical modulator arranged to modulate the portion of the receiver optical signal with the portion of the radio frequency signal for transmission and second optical to electrical signal conversion apparatus arranged to convert the modulated portion of the receiver optical signal into a corresponding reference electrical signal.

The high phase stability at the transmitter and the high resolution at the receiver guaranteed by the proposed transceiver, make it available for dual use including active and passive radar applications.

The transceiver may enable the phase stability of the transmitted and received RF signals to be improved, avoiding the noisy analog up- and down-conversions typical of the electronic RF generation and detection. This reduction of distortions and phase noise may result in increased system sensitivity.

The transceiver may provide high phase stability at the transmitter and high resolution at the receiver, regardless of the carrier frequency.

The architecture of the transceiver may enable it to be constructed using available commercial devices, most comprising integrated technologies, which may allow the immediate and practical realization of a photonics-assisted transceiver, permitting a strong reduction in radar system development costs.

The use of photonics technologies to generate RF signals may allow a completely software-defined RF architecture to be implemented, increasing the level of flexibility and reconfigurability of the radar system.

The use of photonics techniques for generating and detecting the RF signals may allow optical fibres to be used to move signals to and from base station antennae (antenna remoting), reducing the amount of devices and the power consumption at the antenna pole thanks to the negligible attenuation of fibre transmission. This may also simplify antenna installation.

The second optical modulator implements optical sampling of the received radio frequency signal which may realise a signal down-conversion without using a mixer, which may improve the stability and resolution of the receiver apparatus as compared to prior art electronic based transceivers. The receiver apparatus may enable a sampling repetition rate of up to hundreds of GHz to be used and may therefore avoid the limitations imposed on the sampling rate in electronic systems.

In an embodiment, the optical filter is arranged to filter the transmitter optical signal to select a plurality of pairs of the modes, the modes of each pair having the same difference in optical frequencies. The RF signal for transmission may therefore be formed from a number of pairs of modes each having the same detuning.

In an embodiment, the first optical modulator is arranged to modulate the part of the transmitter optical signal with a modulation signal having an intermediate frequency to generate sideband signals. The first optical modulator is arranged to apply a phase modulation to one or more of the sideband signals or the modes. The first photodetector is arranged to heterodyne at least one of the phase modulated signals with at least one of the other signals without a corresponding phase modulation to form at least one radio frequency signal. The at least one radio frequency signal has a carrier frequency corresponding to a difference in optical frequencies of the respective heterodyned signals.

Modulating the transmitter optical signal with a modulation signal having an intermediate frequency, that is a frequency less than the optical frequency spacing of the modes of the mode locked laser, may enable a phase modulation to be encoded onto the resulting RF signal without affecting the reciprocal phase stability of the modes which are to be heterodyned to form the RF signal.

In an embodiment, the first photodetector is arranged to heterodyne the signals to form a plurality of radio frequency signals. Each radio frequency signal has a carrier frequency corresponding to a difference in optical frequencies of the respective heterodyned signals from which it is formed. The transmitter apparatus further comprises a radio frequency signal filter arranged to select one of the radio frequency signals for transmission.

This may allow a completely software-defined RF architecture to be implemented, increasing the level of flexibility and reconfigurability of the radar system, and thus enabling them to simultaneously treat multiple radar signals.

In an embodiment, the radio frequency signal filter is arranged to select the radio frequency signal having a carrier frequency corresponding to the difference in optical frequencies of one of the modes and one of the phase modulated sideband signals. The heterodyne between the mode and the phase modulated sideband signal enables a desired phase and/or amplitude modulation to be incorporated in the RF signal.

In an embodiment, the modulation signal comprises a phase modulation to be carried by the radio frequency signal for transmission.

In an embodiment, the modulation signal comprises a plurality of phase modulations and the transmitter apparatus comprises a plurality of radio frequency signal filters, each said filter being arranged to select a different one of the radio frequency signals for transmission.

In an embodiment, the transmitter apparatus comprises a plurality of first optical modulators, a corresponding plurality of first photodetectors and a corresponding plurality of radio frequency signal filters. Each first optical modulator is arranged to receive a respective modulation signal comprising a respective phase modulation. Each radio frequency signal filter is arranged to select a respective radio frequency signal for transmission.

Configuring the transceiver to be able to select one of a plurality of different RF signals for transmission may enable a reduction in the hardware required for a multi-beam radar system by treating a large number of radar signals in a single transceiver. This may result in a reduction of both the power consumption and the capital expenditure, and may simplify the management of different radar signals in a single base station and the hand-off between them. The generation of combs of phase-stable wireless channels may enable effective frequency hopping techniques.

In an embodiment, the mode-locked laser is arranged to receive an electrical clock signal and is configured to have a pulse repetition rate locked to the electrical clock signal. The transmitter apparatus comprises a clock signal divider arranged to receive the electrical clock signal and arranged to divide the electrical clock signal by a pre-selected division factor, K, to form the modulation signal at the intermediate frequency. This may avoid the use of an ultra-stable clock to produce the modulation signal at the intermediate frequency. The frequency shift of the RF signal carrier frequency introduced by modulation at the intermediate frequency makes the carrier frequency different from the MLL repetition rate. This may enable the transceiver to be used in situations where the RF signal for transmission and the received RF signal have the same carrier frequency.

In an embodiment, the clock signal divider is arranged to divide the electrical clock signal by one of a plurality of division factors, K, to form the modulation signal at one of a plurality of intermediate frequencies. This may provide flexibility in the RF signal carrier frequency, the division factor being selected to obtain a chosen intermediate frequency and thus a chosen carrier frequency.

In an embodiment, the receiver apparatus comprises a rate increaser arranged to increase the repetition rate of the receiver optical signal prior to modulation at the second optical modulator. This may enable a different repetition rate to be used at the transmitter apparatus and the receiver apparatus, allowing optimisation of the repetition rate for each; a lower repetition rate may be used at the transmitter apparatus to set the minimum available RF signal carrier frequency; and a higher repetition rate may be used at the receiver apparatus to set the maximum sampling rate.

In an embodiment, the rate increaser comprises one of an optical time domain multiplexer and an optical filter.

In an embodiment, the second optical modulator is arranged to modulate the receiver optical signal with the received radio frequency signal to form optical samples and the receiver apparatus further comprises sample parallelisation apparatus arranged to receive the optical samples at a first pulse rate and to convert the optical samples into a plurality of streams of optical samples, each stream having a second pulse rate lower than the first pulse rate. The first optical to electrical signal conversion apparatus is arranged to convert the optical samples into corresponding electrical samples. Reducing the pulse rate of the optical samples may enable high-precision electronic analog to digital converters operating a low sampling rates to be used to acquire the samples after detection by the photodetector.

In an embodiment, the sample parallelisation apparatus comprises one of an electro-optical time domain demultiplexer and an all-optical time domain demultiplexer.

In an embodiment, the receiver apparatus further comprises pulse broadening apparatus arranged to receive the optical samples having a first pulse width and to increase the pulse width of the optical samples. In an embodiment the pulse broadening apparatus is arranged to apply a chromatic dispersion to each optical sample. Broadening the pulses prior to detection at the photodetector, so that the spectral bandwidth of the optical samples better fits the bandwidth of the photodetector, may minimise power loss during detection at the photodetector.

In an embodiment, the receiver apparatus is arranged to receive a plurality of radio frequency signals and is arranged to sum said plurality of signals. The second optical modulator is arranged to modulate the receiver optical signal with the summed signals. The mode-locked laser is configured to have a pulse repetition rate which meets the low-pass Nyquist sampling theorem. Selecting the pulse repetition rate, i.e. the sampling rate, to meet the low-pass Nyquist sampling theorem may enable all of the received RF signal to be optically sampled together.

In an embodiment, the receiver apparatus is arranged to receive a plurality of radio frequency signals and is arranged to sum said plurality of signals. The second optical modulator is arranged to modulate the receiver optical signal with the summed signals. The mode-locked laser is configured to have a pulse repetition rate which meets the band-pass Nyquist sampling theorem. If the spectral occupancy of all the received RF signals is low enough, the sampling rate can be reduced, exploiting the band-pass Nyquist theorem instead of the low-pass Nyquist theorem. In this case, if the occupied spectral ranges are a small portion of the available spectrum, the sampling frequency can be chosen in order to allow the correct acquisition of all the signal bands of interest, avoiding the superposition of alias spectra.

In an embodiment, the receiver apparatus is arranged to receive a plurality of radio frequency signals and comprises a plurality of second optical modulators. Each second optical modulator is arranged to receive a respective sub-set of the received radio frequency signals and a portion of the receiver optical signal. The mode-locked laser is configured to have a pulse repetition rate which meets the band-pass Nyquist sampling theorem. If the occupied spectral ranges are too large a portion of the available spectrum (i.e. it is not possible to avoid the superposition of alias spectra) the band-pass Nyquist theorem can be applied to each of a plurality of different portions of the spectrum. Each second optical modulator receives a different portion of the spectrum to be separately sampled, exploiting parallel optical sampling.

In an embodiment, each optical modulator is a Mach-Zehnder optical modulator.

The transceiver may enable simultaneous generation and reception of multi-band wireless signals, which may enable the implementation of a multi-band multi-protocol wireless base station, strongly reducing the hardware requirements and extending the exploited frequency spectrum to the MMB.

A fourth aspect of the invention provides a method of processing radio frequency signals. The method comprises step a. of receiving an optical signal having a plurality of phase-locked modes. The method comprises step b. of power splitting the optical signal into a transmitter optical signal and a receiver optical signal. The method comprises step c. of generating a radio frequency signal for transmission. Step c. comprises step i. of selecting two of the modes of the transmitter optical signal. Step c. comprises step ii. of modulating a part of the transmitter optical signal to form at least one phase modulated optical signal. Step c. comprises step iii. of heterodyning the phase modulated optical signal with one of the modes without a corresponding phase modulation to form a radio frequency signal for transmission. The radio frequency signal for transmission has a carrier frequency corresponding to a difference in optical frequencies of the heterodyned signals. The method comprises step d. of receiving a radio frequency signal and modulating the receiver optical signal with the received radio frequency signal. Step d. further comprises converting the modulated receiver optical signal into a corresponding electrical signal.

The method may enable the phase stability of transmitted and received RF signals to be improved, avoiding the noisy analog up- and down-conversions typical of the electronic RF generation and detection.

The method may provide high phase stability in the transmitted RF signal and high resolution in the reception of an RF signal, regardless of the carrier frequency, which may enable the exploitation of multicarrier orthogonal signals (e.g., orthogonal frequency-division multiplexed (OFDM) signals) in MMB transmissions, which are particularly sensitive to phase stability in the carrier signal.

The method may be implemented using available commercial devices, most comprising integrated technologies, which may allow the immediate and practical realization of a photonics-assisted transceiver, permitting a strong reduction in communications system development costs.

The ability to generate RF signals in the MMB may allow the implementation of cellular communications systems providing gigabit-per-second transmissions to the final users, thanks to the large fractional bandwidth of the MMB, while maintaining compatibility with existing cellular systems.

Generating RF signals photonically may increase the level of flexibility and reconfigurability of cellular communication systems, and may enable the simultaneously treatment of multiple wireless transmission protocols.

Generating and detecting the RF signals photonically may allow optical fibres to be used to move communications signals to and from base station antennae (antenna remoting), reducing the amount of devices and the power consumption at the antenna pole thanks to the negligible attenuation of fibre transmission. This may also simplify antenna installation.

The method comprises optical sampling of the received RF signal which may realise a signal down-conversion without mixing, which may improve the stability and resolution during receiving an RF signal. The method may enable a sampling repetition rate of up to hundreds of GHz to be used and may therefore avoid the limitations imposed on the sampling rate in electronic systems.

In an embodiment, step i. comprises selecting a plurality of pairs of the modes, the modes of each pair having the same difference in optical frequencies. The RF signal for transmission may therefore be formed from a number of pairs of modes each having the same detuning.

In an embodiment, in step ii. the transmitter optical signal is modulated with a modulation signal having an intermediate frequency to generate sideband signals and a phase modulation is applied to one or more of the sideband signals or the modes. Step iii. comprises heterodyning at least one of the phase modulated signals with at least one of the other signals without a corresponding phase modulation to form at least one said radio frequency signal.

Modulating the transmitter optical signal with a modulation signal having an intermediate frequency, that is a frequency less than the optical frequency spacing of the modes of the mode locked laser, may enable a phase modulation to be encoded onto the resulting RF signal without affecting the reciprocal phase stability of the two modes which are to be heterodyned to form the RF signal.

In an embodiment, step iii. comprises heterodyning the signals to form a plurality of radio frequency signals. Each radio frequency signal has a carrier frequency corresponding to a difference in optical frequencies of the respective heterodyned signals from which it is formed. The method further comprises selecting one of the radio frequency signals for transmission.

This may allow increase the level of flexibility and reconfigurability of cellular communication systems, and thus enabling them to simultaneously treat multiple wireless transmission protocols.

In an embodiment, the method comprises selecting the radio frequency signal having a carrier frequency corresponding to the difference in optical frequencies of one of the modes and one of the phase modulated sideband signals. The heterodyne between the mode and the phase modulated sideband signal enables a desired phase and/or amplitude modulation to be incorporated in the RF signal.

In an embodiment, the modulation signal comprises a phase modulation encoding communications traffic to be carried by the radio frequency signal for transmission.

In an embodiment, the modulation signal comprises a plurality of communications traffic signals each comprising respective communications traffic and the method comprises selecting respective ones of the radio frequency signals for transmission.

In an embodiment, the optical signal has a pulse repetition rate locked to an electrical clock signal. The modulation signal is formed by dividing the electrical clock signal by a pre-selected division factor. This may avoid the use of an ultra-stable clock to produce the modulation signal at the intermediate frequency. The frequency shift of the RF signal carrier frequency introduced by modulation at the intermediate frequency makes the carrier frequency different from the MLL repetition rate.

In an embodiment, the electrical clock signal is divided by one of a plurality of division factors, K, to form the modulation signal at one of a plurality of intermediate frequencies. This may provide flexibility in the RF signal carrier frequency, the division factor being selected to obtain a chosen intermediate frequency and thus a chosen carrier frequency.

In an embodiment, the repetition rate of the receiver optical signal is increased prior to modulation with the modulation signal. This may enable a different repetition rate to be used during generation of the RF signal for transmission and during receiving of an RF signal, allowing optimisation of the repetition rate for each; a lower repetition rate may be used during generation to set the minimum available RF signal carrier frequency; and a higher repetition rate may be used during receiving to set the maximum sampling rate.

In an embodiment, step d. comprises receiving the optical samples at a first pulse rate and to converting the optical samples into a plurality of streams of optical samples, each stream having a second pulse rate lower than the first pulse rate. Each optical sample is converted into a corresponding electrical sample. Reducing the pulse rate of the optical samples may enable high-precision electronic analog to digital converters operating a low sampling rates to be used to convert the optical samples.

In an embodiment, step d. further comprises receiving the optical samples having a first pulse width and to increasing the pulse width of the optical samples. Broadening the pulses prior to conversion, so that the spectral bandwidth of the optical samples better fits the detection bandwidth, may minimise power loss during detection and conversion.

In an embodiment, the method comprises receiving a plurality of radio frequency signals and the optical signal has a pulse repetition rate which meets the low-pass Nyquist sampling theorem. This may enable sampling of all of the received RF signals at the same time, which may therefore enable all user channels and all communications bandwidths of a multi-carrier cellular communications network to be acquired at the same time. Selecting the pulse repetition rate, i.e. the sampling rate, to meet the low-pass Nyquist sampling theorem may enable all of the received RF signals to be optically sampled together.

In an embodiment, the method comprises receiving a plurality of radio frequency signals and the optical signal has a pulse repetition rate which meets the band-pass Nyquist sampling theorem. If the spectral occupancy of all the received RF signals is low enough, the sampling rate can be reduced, exploiting the band-pass Nyquist theorem instead of the low-pass Nyquist theorem. In this case, if the occupied spectral ranges are a small portion of the available spectrum, the sampling frequency can be chosen in order to allow the correct acquisition of all the communication bands of interest, avoiding the superposition of alias spectra.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of processing radio frequency signals.

In an embodiment, the data carrier is a non-transitory data carrier.

Embodiments of the invention will now be described, by way of example only, with reference to the accompanying drawings.

DETAILED DESCRIPTION

Figure 1:
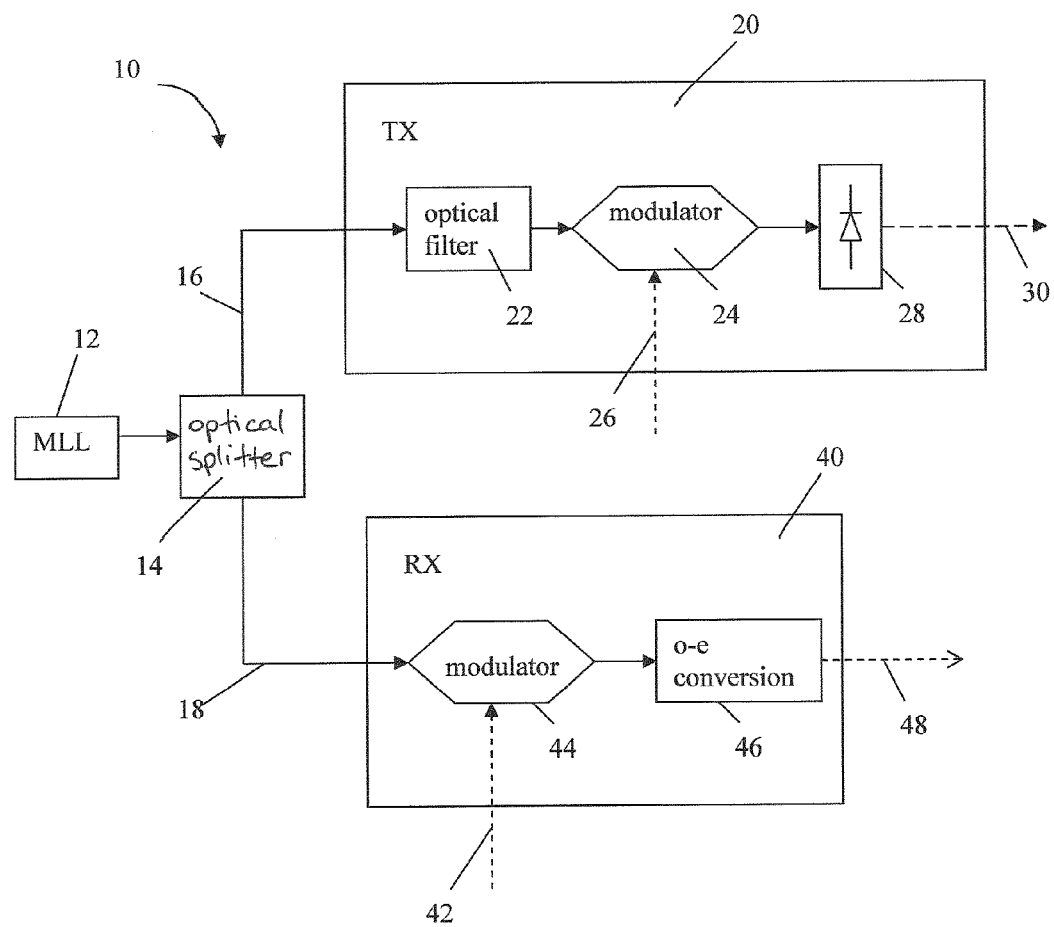
FIG. 1 is a schematic representation of an RF signal transceiver according to a first embodiment of the invention.

Referring to FIG. 1, a first embodiment of the invention provides an RF signal transceiver 10 comprising a mode-locked laser 12, an optical splitter 14, transmitter apparatus 20 and receiver apparatus 40.

The mode-locked laser 12 is arranged to output an optical signal having a plurality of phase-locked modes. The optical splitter 14 is arranged to power split the optical signal received from the mode-locked laser into a transmitter optical signal 16 and a receiver optical signal 18.

The transmitter apparatus 20 is arranged to receive the transmitter optical signal. The transmitter apparatus comprises an optical filter 22, a first optical modulator 24 and a first photodetector 28. The optical filter 22 is arranged to filter the transmitter optical signal 16 to select two of the phase-locked modes. The first optical modulator 24 is arranged to modulate a part of the transmitter optical signal received from the optical filter to form at least one phase-modulated optical signal. The first photodetector 28 is arranged to heterodyne the phase-modulated optical signal with one of the selected modes that does not have a phase modulation, to thereby form a radio frequency signal 30 for transmission. The RF signal for transmission has a carrier frequency corresponding to the difference in the optical frequencies of the heterodyned signals.

The receiver apparatus 40 is arranged to receive an RF signal 42 and the receiver optical signal 18. The receiver apparatus 40 comprises a second optical modulator 44 and first optical to electrical (O-E) signal conversion apparatus 46. The second optical modulator 44 is arranged to modulate the receiver optical signal 18 with the received RF signal 42. The first O-E signal conversion apparatus 46 is arranged to convert the modulated receiver optical signal received from the second optical modulator into a corresponding electrical signal 48.

The transceiver 10 is able to transmit and receive high stability amplitude and/or phase-modulated RF signals, using a single mode-locked laser 12 for both the transmitter apparatus 20 and the receiver apparatus 40. This may overcome any constraints on the sampling frequency while maintaining the phased stability of the mode-locked laser for both the RF signal generation and sampling. Since the mode-locked laser represents the most complex and expensive photonic component required in photonics based transceivers such as the one shown in FIG. 1, the use of a single mode-locked laser allows for a reduction in terms of cost and complexity. Use of a single mode-locked laser for both the transmitter apparatus and the receiver apparatus may allow the transceiver 10 to provide very high phase stability at the transmitter apparatus and high resolution at the receiver apparatus.

Use of photonics technologies in the transceiver 10 may enable the limitations of electronic-based devices to be overcome, enabling the realisation of a single photonic transceiver capable of communicating both in the crowded UHF frequency and in the underutilized MMB.

Figure 2:
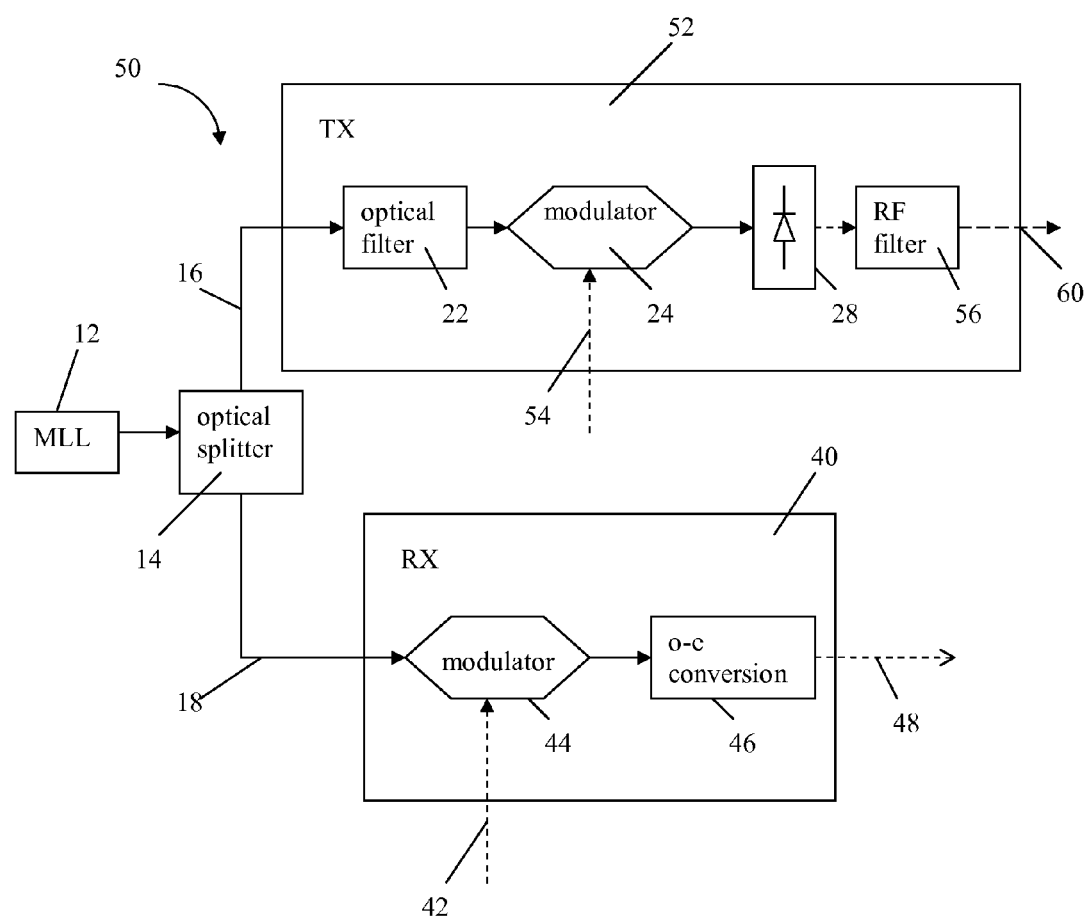
FIG. 2 is a schematic representation of an RF signal transceiver according to a second embodiment of the invention.

Referring to FIG. 2, a second embodiment of the invention provides an RF signal transceiver 50 which is similar to the RF signal transceiver 10 of FIG. 1, with the following modifications. The same reference numbers are retained for corresponding features.

In this embodiment the first optical modulator 24 is arranged to modulate part of the transmitter optical signal 16 with a modulation signal 54 having an intermediate frequency. This causes sideband signals to be generated alongside the mode-locked laser modes which have been selected. The first optical modulator 24 is also arranged to apply a phase modulation to one of the sideband signals.

The photodetector 28 is arranged to heterodyne the phased modulated sideband signal with one of the laser modes that has not had a phase modulation applied to it, to thereby form an RF signal 60 for transmission.

The optical filter 22 is arranged to filter the transmitter optical signal 16 to select a plurality of pairs of the modes. The modes of each pair have the same difference in optical frequencies, i.e. the same detuning.

In this embodiment, the filtered transmitter optical signal 16 is split on entry to the modulator 24, with one half of the transmitter optical signal being modulated with the modulation signal 54 and the other half of the transmitter optical signal not being modulated. As a result, the output from the modulator 24 comprises both unmodulated and modulated versions of the selected modes plus phase modulated sideband signals. The photodetector 28 heterodynes each pair of signals and the transmitter apparatus 52 further comprises an RF signal filter 56 arranged to select one of the resulting RF signals for transmission.

Figure 3:
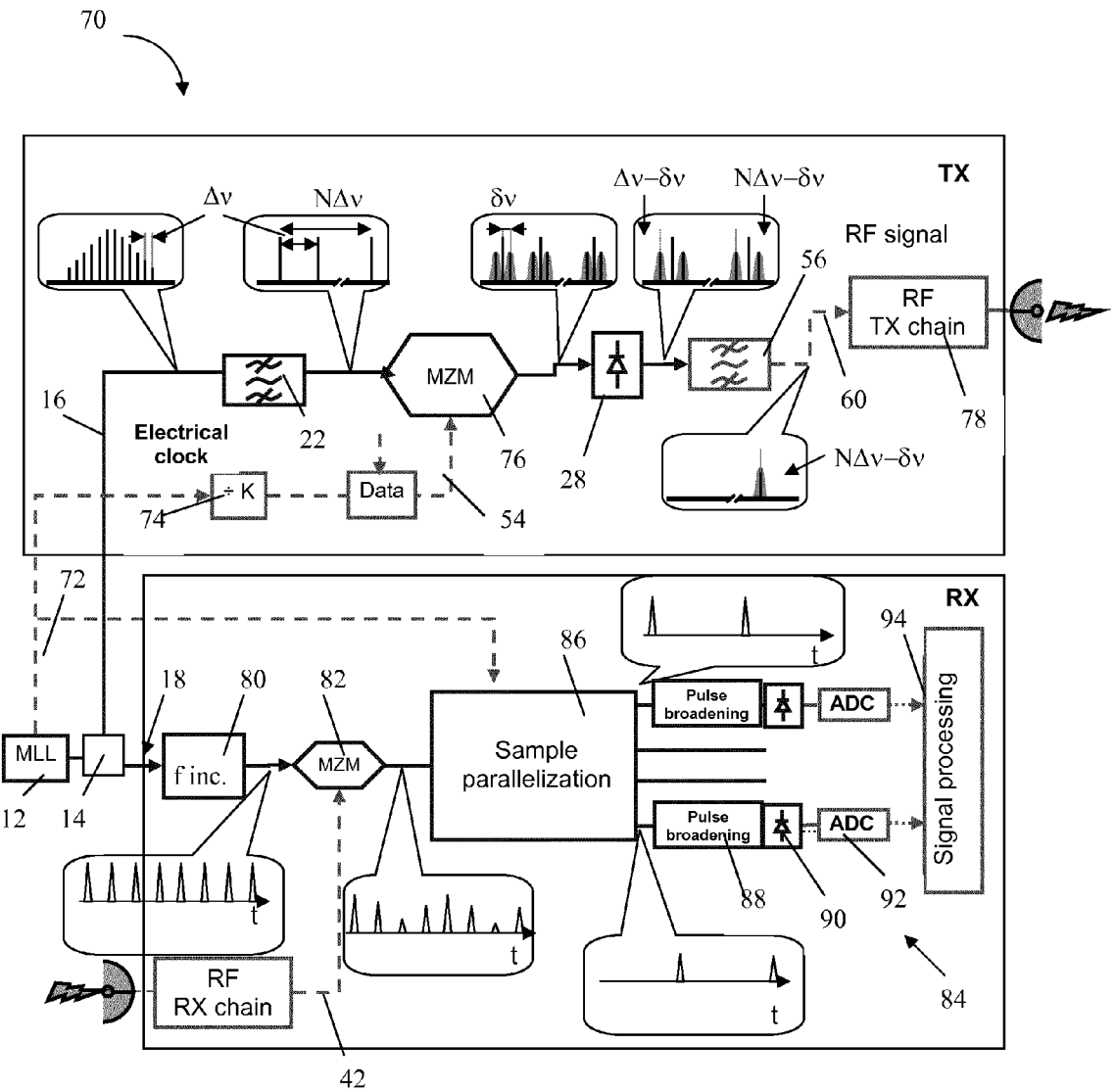
FIG. 3 is a schematic representation of an RF signal transceiver according to a third embodiment of the invention.

An RF signal transceiver 70 according to a third embodiment of the invention is shown in FIG. 3. The RF transceiver 70 of this embodiment is similar to the RF transceiver 50 of FIG. 2, with the following modifications. The same reference numbers are retained for corresponding features.

In this embodiment the mode-locked laser 12 is arranged to receive an electrical clock signal 72. The mode-locked laser 12 is configured to have a pulse repetition rate locked to the electrical clock signal. As shown in the insert figure located before the optical filter 22, the mode-locked laser 12 has an optical spectrum composed of a large number of laser lines/modes which are perfectly phase-locked and whose spacing $\Delta\upsilon$ is equal to the repetition rate of the mode-locked laser 12. Following the optical filter 22 two mode-locked laser modes are selected, having a frequency detuning, $f_c = N\Delta\upsilon$, where N is an integer.

The transmitter apparatus, TX comprises a clock signal divider 74 which is arranged to receive the electrical clock signal 72 and is arranged to divide the electrical clock signal by a pre-selected division factor, K, to form the modulation signal at the intermediate frequency, δυ. The modulation signal additionally comprises a communications signal carrying communications traffic (data) which is encoded onto the modulation signal as a phase modulation.

In this embodiment, the first optical modulator is a Mach-Zehnder modulator, MZM, 76. The two selected modes of the mode-locked laser are power split on entry to the MZM 76. The signals transmitted through the lower arm of the MZM have the modulation signal applied to them and the signals transmitted through the upper arm of the MZM have no modulation applied to them. Therefore on exiting the MZM both unmodulated and modulated versions of the modes plus phase modulated sideband signals are present, the sideband signals being separated from their respective modes by a frequency detuning equal to the intermediate frequency.

Modulating part of the power of both of the selected laser modes with the intermediate frequency, plus the phased modulation to apply the communications traffic, means that after the photodiode 28 several components are present within the RF spectrum, as shown by the insert spectrum after the photodetector 28. The heterodyne between each unmodulated laser mode and a respective sideband signal results in the phase modulation being applied to the resulting RF signal. One of the RF signals is then selected by the RF signal filter 56 to form the RF signal for transmission 60. The transmission apparatus of this embodiment additionally comprises an RF transmission chain 78 to transmit the RF signal.

It will be appreciated that the division factor, K, may be selected to form the modulation signal at a chosen intermediate frequency, and that changing the division factor will correspondingly change the intermediate frequency.

In this embodiment the receiver apparatus comprises a rate increaser 80 which is arranged to increase the repetition rate of the receiver optical signal 18 prior to modulation at the second optical modulator 82, which here also comprises an MZM. The receiver apparatus, RX, here additionally comprises sample parallelisation apparatus 86. The sample parallelisation apparatus is arranged to receive optical samples from the MZM 82 at a first pulse/sampling rate and to convert the optical samples into a plurality of streams of optical samples, each stream having a lower pulse/sampling rate. The sample parallelisation apparatus 88 comprises either an E-O time domain demultiplexer or an all-optical time domain demultiplexer, such as that described by L. Ma et al "Demonstration of an optical sample parallelisation exploiting FWM in HNLF for high-speed photonic assisted EDCs", Electronics Letters, Volume 47, No. 5, pages 333-335, March 2011.

The E-O conversion apparatus 84 comprises pulse broadening apparatus 88, photodetectors 92 and analog to digital converters (ADC) 94. The pulse broadening apparatus 90 in this example is a chirped fibre Bragg grating. It will be appreciated that any element arranged to add chromatic dispersion to the pulses may be used for pulse broadening, such as dispersion compensating fibre. The pulse broadening apparatus 88 is arranged to receive the optical samples having the first pulse width from the sample parallelisation apparatus 86 and is arranged to increase the pulse width of the optical samples.

Following pulse broadening the optical samples are converted into corresponding electrical samples in the photodetectors 90 and then converted to digital signals in the ADC 92. The digitized samples are then transmitted to signal processing apparatus 94.

Figure 4:
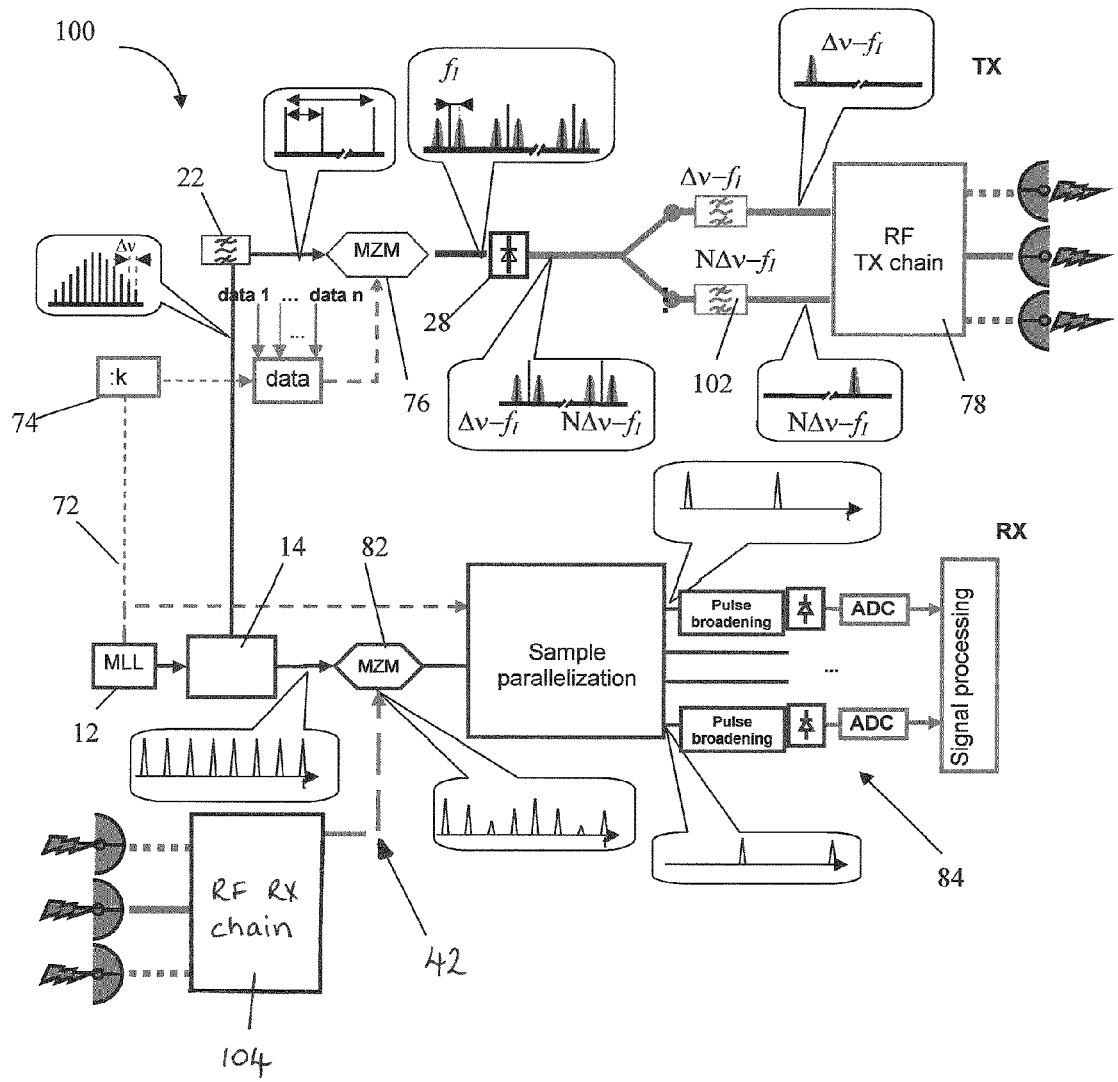
FIG. 4 is a schematic representation of an RF signal transceiver according to a fourth embodiment of the invention.

An RF signal transceiver 100 according to a fourth embodiment of the invention is shown in FIG. 4. The RF transceiver of this embodiment is similar to the RF signal transceiver 70 of FIG. 3 with the following modifications, the same reference numbers are retained for corresponding features.

In this embodiment, the modulation signal comprises a plurality of communications traffic signals, each comprising respective communications traffic (data 1 to data n). The transmitter apparatus, TX, comprises a plurality of RF signal filters 102. Each filter 102 is arranged to select a different one of the RF signals generated at the photodetector 28.

The receiver apparatus comprises an RF receiver, RX, chain 104 which is arranged to receive and sum a plurality of RF signals. The summed signals 42 modulate the receiver optical signal 18 at the MZM 82, as described above.

In this embodiment, the mode-locked laser 12 is configured to have a pulse repetition rate, and thus the receiver apparatus is configured to have a sampling rate, which meets the low-pass Nyquist sampling theorem. Sampling of all of the received RF signals can therefore be carried out at the same time.

Figure 5:
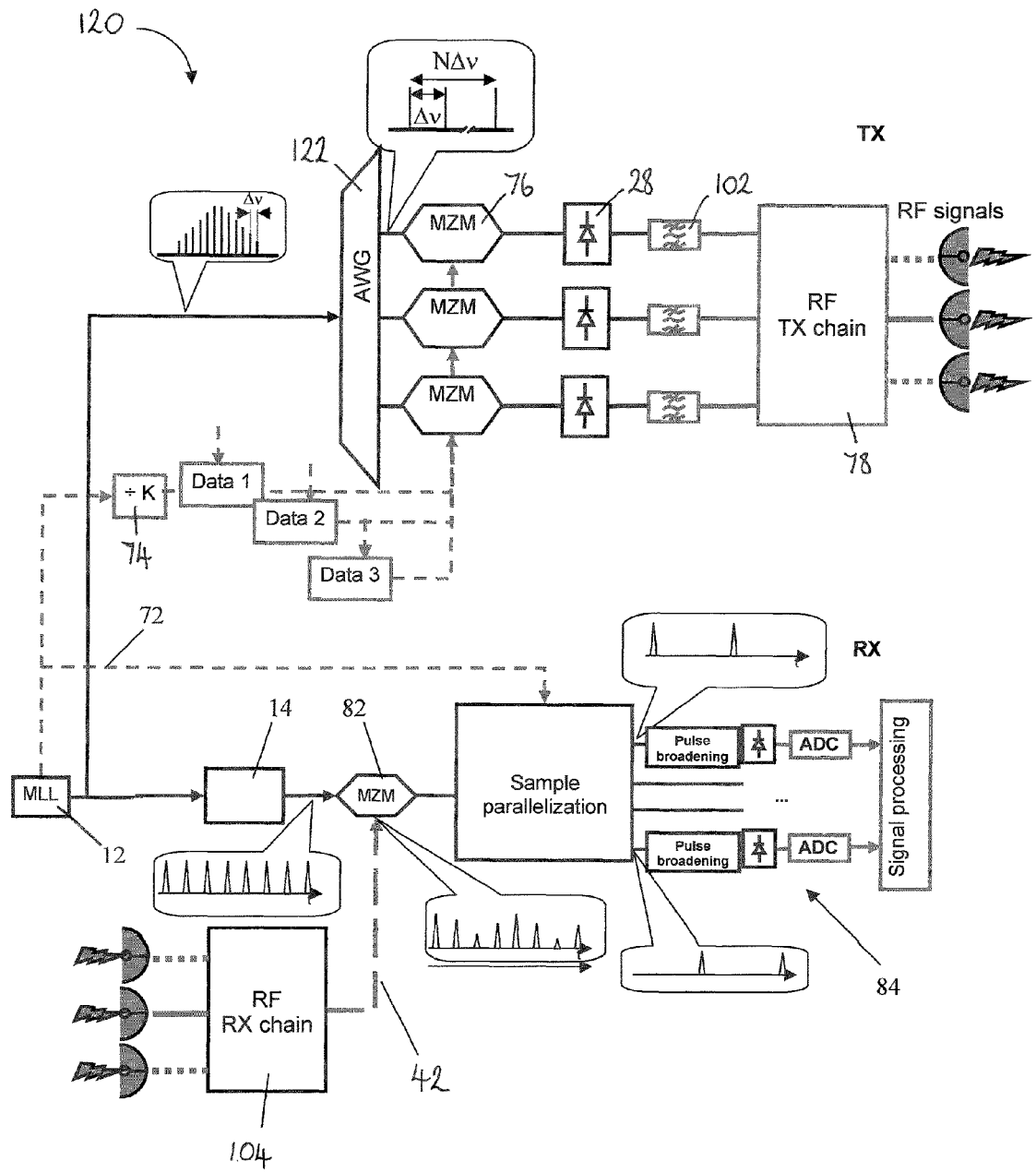
FIG. 5 is a schematic representation of an RF signal transceiver according to a fifth embodiment of the invention.

An RF transceiver 120 according to a fifth embodiment of the invention is shown in FIG. 5. The RF transceiver 120 of this embodiment is similar to the RF transceiver 100 of FIG. 4, with the following modifications. The same reference numbers are retained for corresponding features.

In this embodiment the transmitter apparatus, TX, comprises a plurality of Mach-Zehnder modulators 76, a corresponding plurality of photodetectors 28 and a corresponding plurality of RF signal filters 102. Only three MZMs, photo detectors and filters are shown in the Figure, but it will be appreciated that a larger or smaller number may alternatively be used. Each MZM 76 is arranged to receive a respective modulation signal at the intermediate frequency, comprising a respective communications traffic signal (Data 1, Data 2, Data 3) carrying respective communications traffic.

The transmitter apparatus additionally comprises a wavelength demultiplexer, which in this example takes the form of an arrayed waveguide grating, AWG, 122 which is arranged to receive the transmitter optical signal and to deliver respective sets of the laser modes to each MZM 76.

The mode-locked laser 12 is configured to have a pulse repetition rate, and thus a sampling rate, which meets the band-pass Nyquist sampling theorem. This is possible where the spectral occupancy of the received RF signals is sufficiently low and the occupied spectral ranges are a small portion of the available spectrum. The pulse repetition rate, and thus sampling frequency, can be chosen in order to allow acquisition of all of the communication bands of interest, avoiding the super-position of alias spectra generated as a result of the sampling process.

Figure 6:
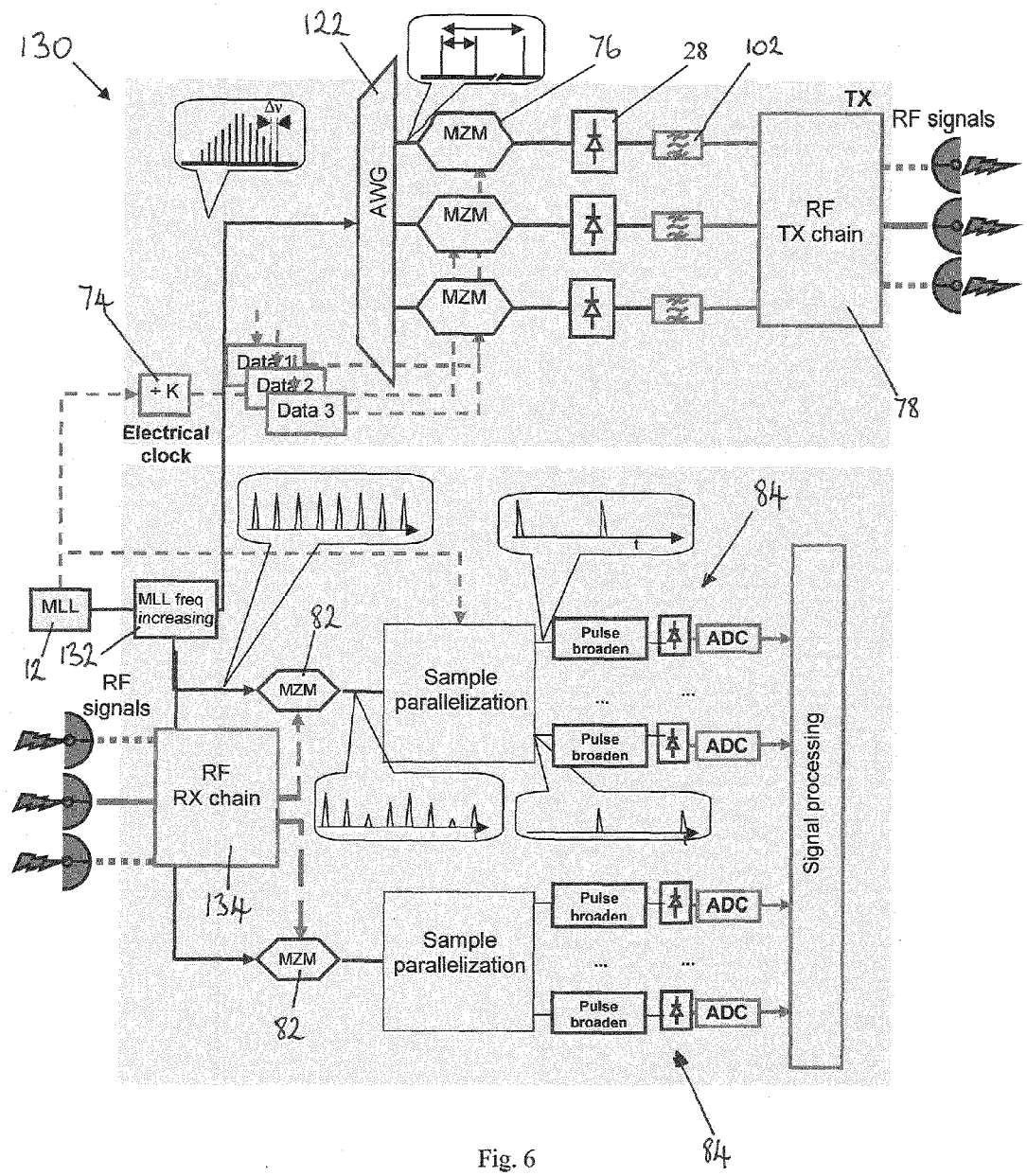
FIG. 6 is a schematic representation of an RF signal transceiver according to a sixth embodiment of the invention.

An RF signal transceiver 130 according to a sixth embodiment of the invention is shown in FIG. 6. The RF transceiver 130 of this embodiment is similar to the RF signal transceiver 120 of FIG. 5, with the following modifications. The same reference numbers are retained for corresponding features.

In this embodiment, the receiver apparatus is arranged to receive a plurality of RF signals and comprises a plurality of MZM 82, each arranged to receive a respective sub-set of the received RF signals, together with a portion of the receiver optical signal 18. The mode-locked laser 12 is configured to have a pulse repetition rate, and thus a sampling rate at the receiver, which meets the band-pass Nyquist sampling theorem. This arrangement may be used if the occupied spectral ranges form too large a portion of the available spectrum, that is to say where it is not possible to avoid the superposition of alias spectra during the sampling process, and the band-pass Nyquist theorem can therefore be applied to restricted portions of the spectrum.

Figure 7:
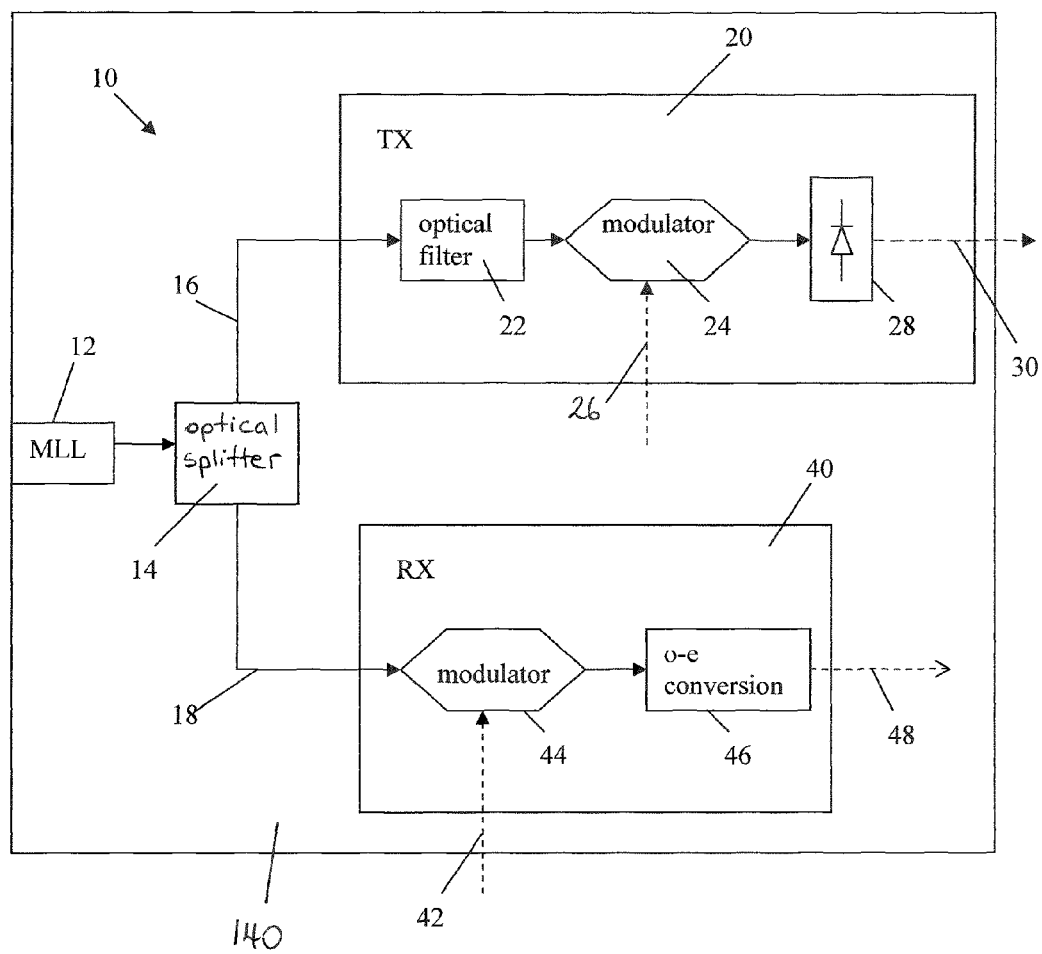
FIG. 7 is a schematic representation of a mobile communications network base station according to a seventh embodiment of the invention.

A seventh embodiment of the invention provides a mobile communications network base station 140, as shown in FIG. 7. The base station 140 comprises an RF signal transceiver 10 as shown in FIG. 1, but it will be appreciated that any of the RF transceivers shown in FIGS. 1 to 6 may be used.

Figure 8:
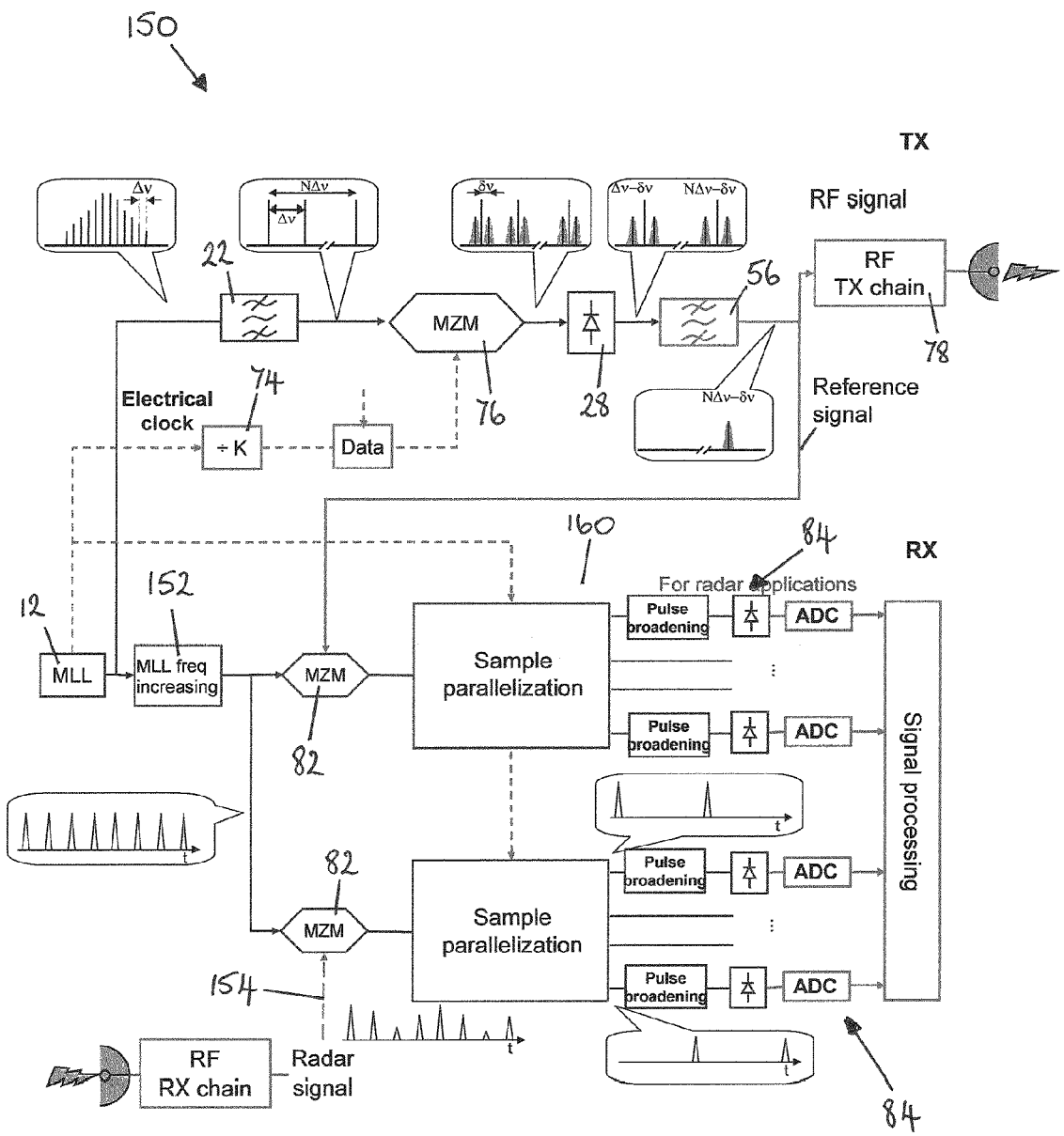
FIG. 8 is a schematic representation of coherent radar system according to an eighth embodiment of the invention.

An eighth embodiment of the invention provides a coherent radar transceiver 150, as shown in FIG. 8. The radar transceiver 150 comprises an RF signal transceiver 70 as shown in FIG. 3, but it will be appreciated that any of the RF signal transceivers shown in FIGS. 1 to 6 may be used.

In the radar transceiver 150 the receiver apparatus, RX, additionally comprises reference signal sampling apparatus 160 which is arranged to receive a portion of the RF signal for transmission 60 and a portion of the receiver optical signal 18. The reference signal sampling apparatus comprises a third Mach-Zehnder modulator 82 and a second O-E signal conversion apparatus 84. The MZM 82 is arranged to modulate the portion of the receiver optical signal with the portion of the RF signal for transmission. The second O-E signal conversion apparatus 84 comprises sample parallelisation apparatus 86, pulse broadening apparatus 88, photodetectors 90 and ADC apparatus 92 as described above.

Figure 9:
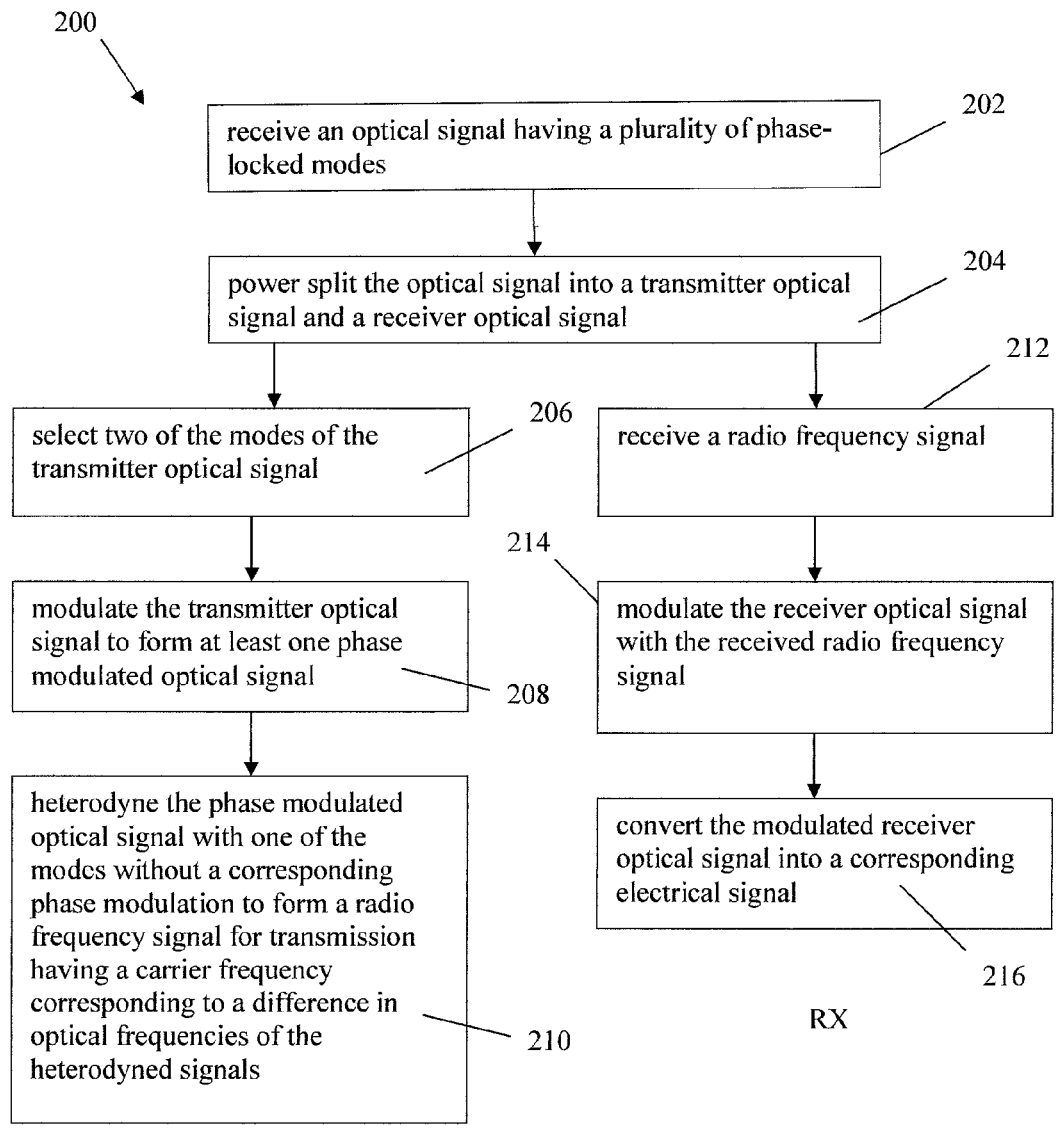
FIG. 9 shows the steps of a method according to a ninth embodiment of the invention of processing RF signals.

A ninth embodiment of the invention provides a method 200 of processing radio frequency signals having the steps shown in FIG. 9.

The method 200 comprises:
a. receiving an optical signal having a plurality of phase-locked modes 202;
b. power splitting the optical signal into a transmitter optical signal and a receiver optical signal 204;
c. generating a radio frequency signal for transmission by:
 i. selecting two of the modes of the transmitter optical signal 206;
 ii. modulating a part of the transmitter optical signal to form at least one phase modulated optical signal 208; and
 iii. heterodyning the phase modulated optical signal with one of the modes without a corresponding phase modulation to form a radio frequency signal for transmission having a carrier frequency corresponding to a difference in optical frequencies of the heterodyned signals 210;
and
d. receiving a radio frequency signal 212 and:
 modulating the receiver optical signal with the received radio frequency signal 214; and
 converting the modulated receiver optical signal into a corresponding electrical signal 216.

Figure 10:
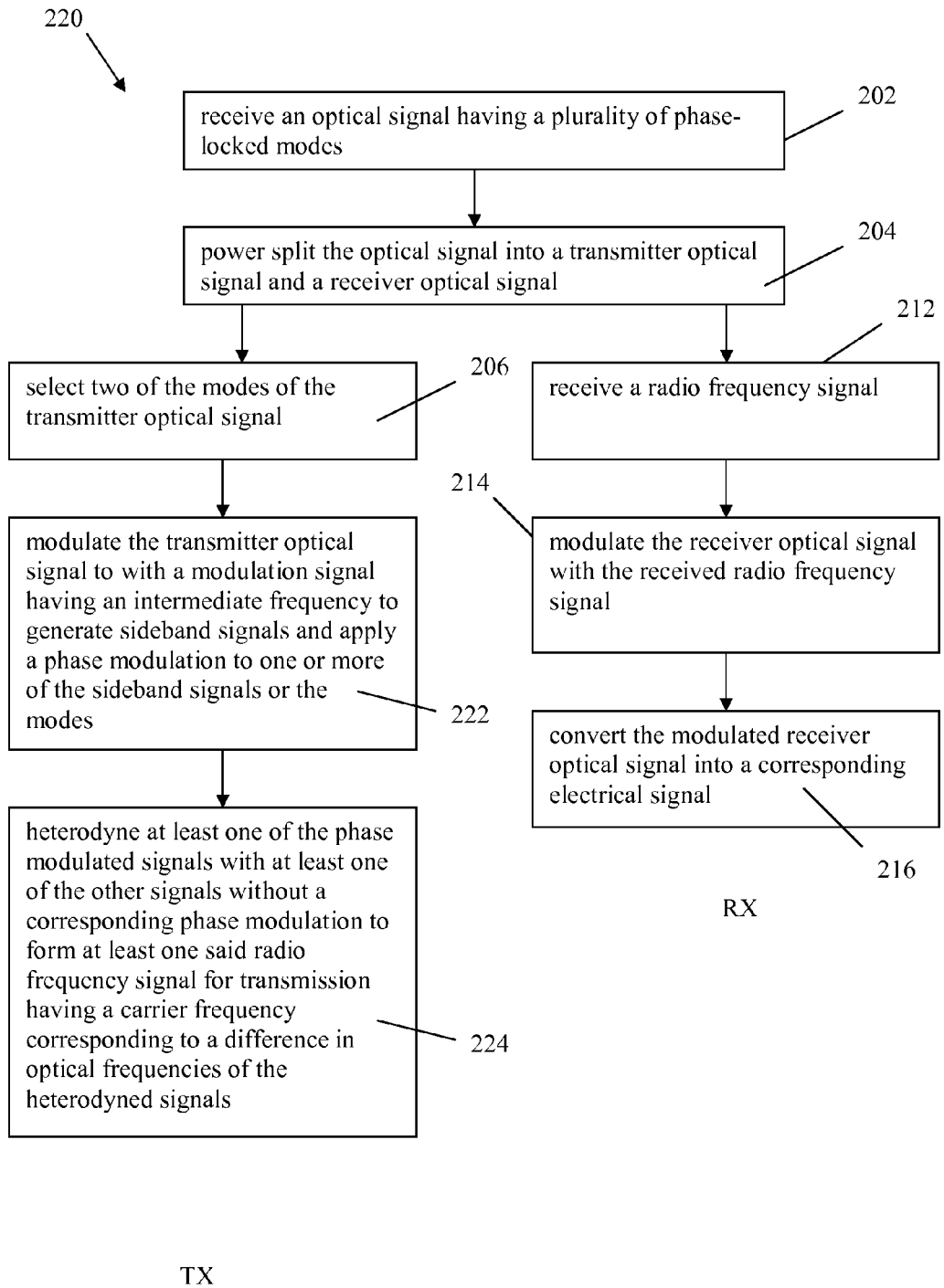
FIG. 10 shows the steps of a method according to a tenth embodiment of the invention of processing RF signals.

A tenth embodiment of the invention provides a method 220 of processing radio frequency signals having the steps shown in FIG. 10. The method 220 of this embodiment is similar to the method 200 of FIG. 9, with the following modifications. The same reference numbers are retained for corresponding steps.

In this embodiment, in step b. ii. the transmitter optical signal is modulated with a modulation signal having an intermediate frequency to generate sideband signals and a phase modulation is applied to one or more of the sideband signals or the modes 222. Step b. iii. comprises heterodyning at least one of the phase modulated signals with at least one of the other signals without a corresponding phase modulation to form at least one radio frequency signal for transmission 224, the RF signal having a carrier frequency corresponding to a difference in optical frequencies of the heterodyned signals.

Figure 11:
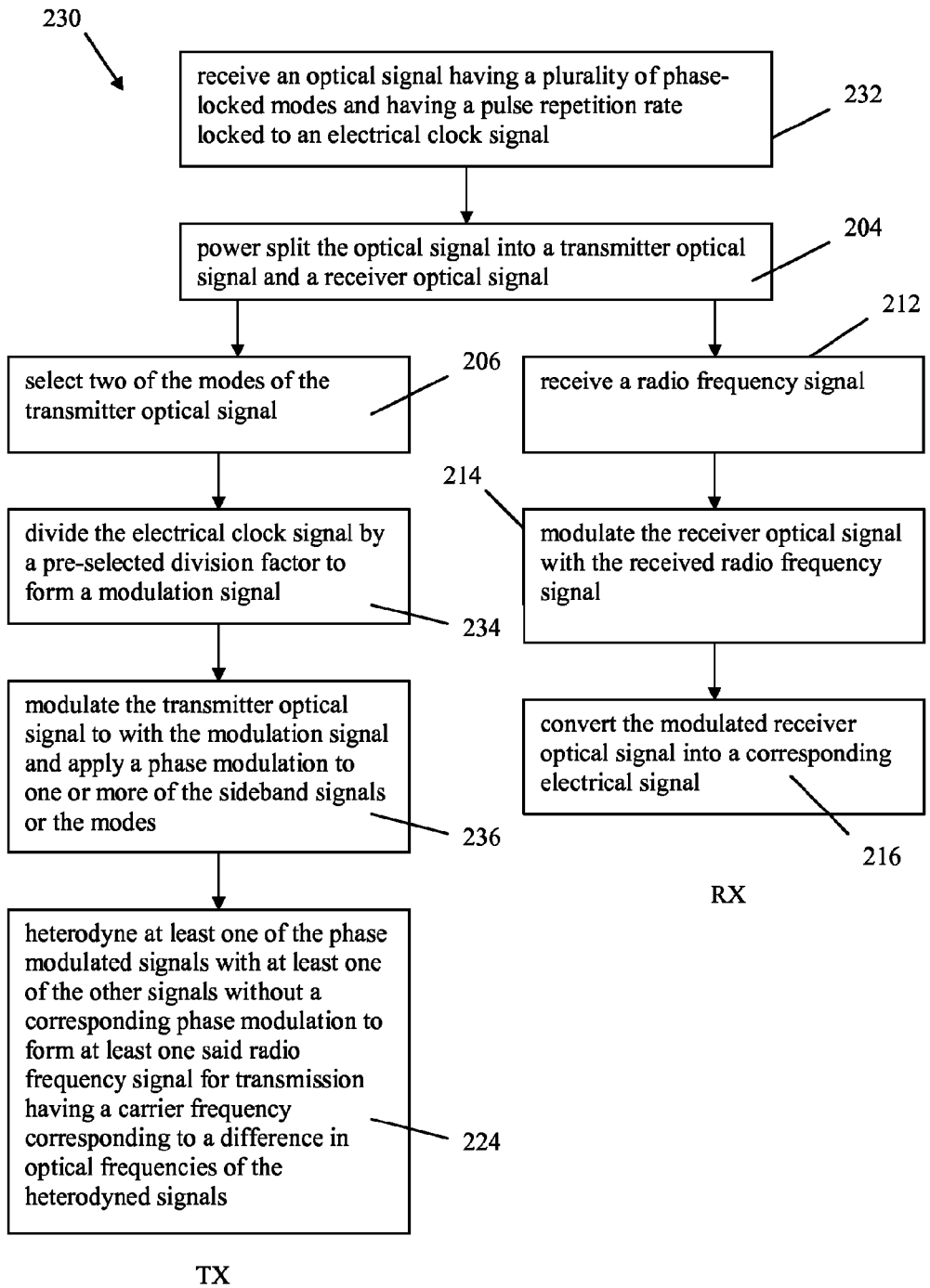
FIG. 11 shows the steps of a method according to an eleventh embodiment of the invention of processing RF signals.

An eleventh embodiment of the invention provides a method 230 of processing radio frequency signals having the steps shown in FIG. 11. The method 230 of this embodiment is similar to the method 220 of FIG. 10, with the following modifications. The same reference numbers are retained for corresponding steps.

In this embodiment the optical signal has a pulse repetition rate locked to an electrical clock signal 232. The modulation signal is formed by dividing the electrical clock signal by a pre-selected division factor 234 and the transmitter optical signal is modulated with the modulation signal 236.

Figure 12:
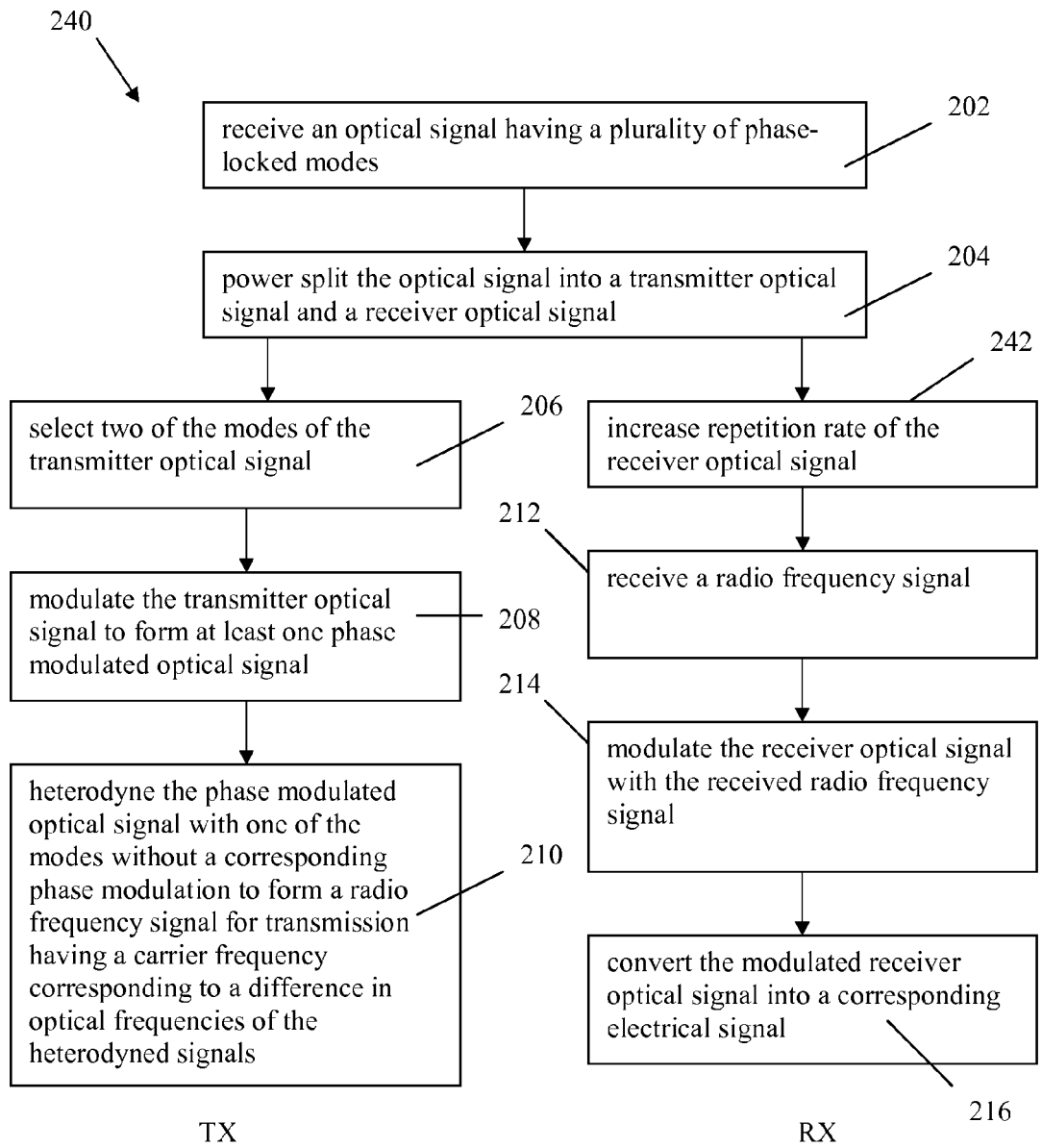
FIG. 12 shows the steps of a method according to a twelfth embodiment of the invention of processing RF signals.

A twelfth embodiment of the invention provides a method 240 of processing radio frequency signals having the steps shown in FIG. 12. The method 240 of this embodiment is similar to the method 200 of FIG. 9, with the following modifications. The same reference numbers are retained for corresponding steps.

In this embodiment the repetition rate of the receiver optical signal is increased prior to modulation with the modulation signal 242.

Figure 13:
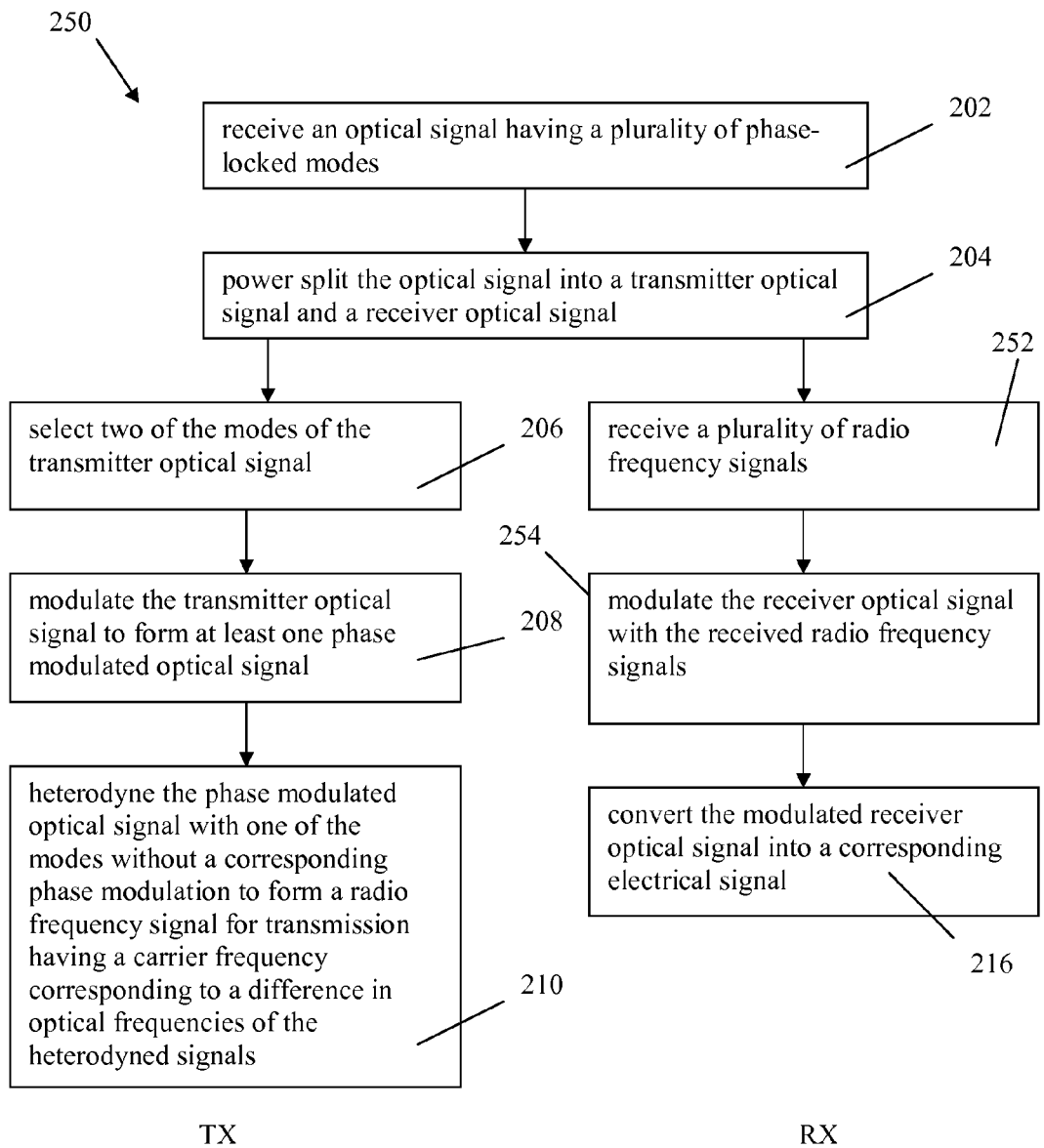
FIG. 13 shows the steps of a method according to a thirteenth embodiment of the invention of processing RF signals.

A thirteenth embodiment of the invention provides a method 250 of processing radio frequency signals having the steps shown in FIG. 13. The method 250 of this embodiment is similar to the method 200 of FIG. 9, with the following modifications. The same reference numbers are retained for corresponding steps.

In this embodiment the method comprises receiving a plurality of radio frequency signals 252 and the receiver optical signal is modulated with the received radio frequency signals 254.

The optical signal has a pulse repetition rate which meets the low-pass Nyquist sampling theorem. This enables a single optical sampling process to be applied for all of the received RF signals.

Alternatively, if the spectral occupancy of the received RF signals is low enough, the pulse repetition rate, and thus the sampling rate, can be reduced, exploiting the band-pass Nyquist theorem instead of the low-pass Nyquist theorem. In this case, if the occupied spectral ranges are a small portion of the available spectrum, the sampling frequency can be chosen in order to allow the correct acquisition of all the RF signals of interest, avoiding any superposition of alias spectra during the sampling process. On the other hand, if the occupied spectral ranges are too large a portion of the available spectrum (i.e. it is not possible to avoid the superposition of alias spectra) the band-pass Nyquist theorem can be applied on restricted portions of the spectrum. In this case different portions of the spectrum must first be separated out and are then separately sampled using parallel optical sampling.

A fourteenth embodiment of the invention provides a data carrier having computer readable instructions embodied therein. The computer readable instructions are for providing access to resources available on a processor. The computer readable instructions comprise instructions to cause the processor to perform any of the steps of any of the methods of processing radio frequency signals shown in FIGS. 9 to 13. The data carrier is a non-transitory data carrier.

The invention claimed is:
1. A radio frequency signal transceiver comprising:
a mode-locked laser arranged to output an optical signal having a plurality of phase-locked modes;

an optical splitter arranged to power split the optical signal into a transmitter optical signal and a receiver optical signal;

a transmitter apparatus arranged to receive the transmitter optical signal, the transmitter apparatus comprising:
  an optical filter arranged to filter the transmitter optical signal to select two of the modes and arranged to deliver respective sets of the phase-locked modes to each of a plurality of first optical modulators;
  the plurality of first optical modulators arranged to modulate a part of the transmitter optical signal to form at least one phase modulated optical signal; and
  a first photodetector arranged to heterodyne the phase modulated optical signal with one of the modes without a corresponding phase modulation to form a radio frequency signal for transmission having a carrier frequency corresponding to a difference in optical frequencies of the heterodyned signals;
and a receiver apparatus arranged to receive a radio frequency signal and the receiver optical signal, the receiver apparatus comprising:
  a plurality of second optical modulators arranged to modulate the receiver optical signal having the plurality of phase-locked modes with the received radio frequency signal; and
  a first optical to electrical signal conversion apparatus arranged to convert the modulated receiver optical signal into a corresponding electrical signal,
wherein the radio frequency signal transceiver is arranged to have one or both of a first arrangement and a second arrangement, wherein:
  in the first arrangement, the receiver apparatus is arranged to receive a plurality of radio frequency signals, and the plurality of second optical modulators are each arranged to receive a respective sub-set of the received radio frequency signals; and
  in the second arrangement, the transmitter apparatus is arranged to generate a plurality of radio frequency signals, and the plurality of first optical modulators are each arranged to generate a respective sub-set of the radio frequency signals for transmission.

2. A radio frequency signal transceiver as claimed in claim 1, wherein:
the first optical modulator is arranged to modulate the part of the transmitter optical signal with a modulation signal having an intermediate frequency to generate sideband signals and the first optical modulator is arranged to apply a phase modulation to one or more of the sideband signals or the modes; and
the first photodetector is arranged to heterodyne at least one of the phase modulated signals with at least one of the other signals without a corresponding phase modulation to form at least one said radio frequency signal.

3. A radio frequency signal transceiver as claimed in claim 2, wherein the mode-locked laser is arranged to receive an electrical clock signal and is configured to have a pulse repetition rate locked to the electrical clock signal and wherein the transmitter apparatus comprises a clock signal divider arranged to receive the electrical clock signal and arranged to divide the electrical clock signal by a preselected division factor, K, to form the modulation signal.

4. A radio frequency signal transceiver as claimed in claim 1, wherein the receiver apparatus comprises a rate increaser arranged to increase the repetition rate of the receiver optical signal prior to modulation at the second optical modulator.

5. A mobile communications network base station comprising a radio frequency signal transceiver as claimed in claim 1.

6. A coherent radar transceiver comprising a radio frequency signal transceiver as claimed in claim 1, wherein the receiver apparatus further comprises a reference signal sampling apparatus arranged to receive a portion of the radio frequency signal for transmission and a portion of the receiver optical signal, the reference signal sampling apparatus comprising a third optical modulator arranged to modulate the portion of the receiver optical signal with the portion of the radio frequency signal for transmission and a second optical to electrical signal conversion apparatus arranged to convert the modulated portion of the receiver optical signal into a corresponding reference electrical signal.

7. A method of processing radio frequency signals comprising:
  a. receiving an optical signal having a plurality of phase-locked modes;
  b. power splitting the optical signal into a transmitter optical signal and a receiver optical signal;
  c. generating a radio frequency signal for transmission by:
    i. selecting two of the modes of the transmitter optical signal and delivering respective sets of the phase-locked modes to each of a plurality of first optical modulators;
    ii. modulating a part of the transmitter optical signal with the plurality of first optical modulators to form at least one phase modulated optical signal; and
    iii. heterodyning the phase modulated optical signal with one of the modes without a corresponding phase modulation to form a radio frequency signal for transmission having a carrier frequency corresponding to a difference in optical frequencies of the heterodyned signals;
  and
  d. receiving a radio frequency signal, and
    a plurality of second optical modulators modulating the receiver optical signal having the plurality of phase-locked modes with the received radio frequency signal; and
    converting the modulated receiver optical signal into a corresponding electrical signal,
  wherein the receiving the radio frequency signal comprises receiving a plurality of radio frequency signals, and
  wherein the method comprises one or both of a receiving function and a transmission function:
    wherein the receiving function comprises:
      the modulating the receiver optical signal comprising modulating the receiver optical signal with the plurality of second optical modulators each receiving a respective sub-set of the received radio frequency signal; and
    wherein the transmission function comprises:
      the generating the radio frequency signal for transmission comprising generating a plurality of radio frequency signals with the plurality of first optical modulators each generating a respective sub-set of the radio frequency signals for transmission.

8. A method as claimed in claim 7, wherein in ii. the transmitter optical signal is modulated with a modulation signal having an intermediate frequency to generate sideband signals and a phase modulation is applied to one or more of the sideband signals or the modes, and iii. comprises heterodyning at least one of the phase modulated signals with at least one of the other signals without a corresponding phase modulation to form at least one said radio frequency signal.

9. A method as claimed in claim 8, wherein the optical signal has a pulse repetition rate locked to an electrical clock signal and wherein the modulation signal is formed by dividing the electrical clock signal by a pre-selected division factor.

10. A method as claimed in claim 9, wherein the repetition rate of the receiver optical signal is increased prior to modulation with the modulation signal.

11. A method as claimed in claim 7, wherein the method comprises receiving a plurality of radio frequency signals and the optical signal has a pulse repetition rate which meets the band-pass Nyquist sampling theorem.

* * * * *